(12) United States Patent
Siann et al.

(10) Patent No.: US 10,687,028 B2
(45) Date of Patent: Jun. 16, 2020

(54) VIDEO DELIVERY SYSTEMS USING WIRELESS CAMERAS

(71) Applicant: AXIS AB, Lund (SE)

(72) Inventors: Jon Siann, Rancho Santa Fe, CA (US); Bradford S. Wallace, Poway, CA (US)

(73) Assignee: AXIS AB, Lund (SE)

( * ) Notice: Subject to any disclaimer, the term of this patent is extended or adjusted under 35 U.S.C. 154(b) by 377 days.

(21) Appl. No.: 15/052,677

(22) Filed: Feb. 24, 2016

(65) Prior Publication Data

US 2016/0173833 A1 Jun. 16, 2016

Related U.S. Application Data

(63) Continuation of application No. 12/359,259, filed on Jan. 23, 2009, now Pat. No. 9,282,297.

(Continued)

(51) Int. Cl.
*H04N 7/18* (2006.01)
*H04N 21/61* (2011.01)
(Continued)

(52) U.S. Cl.
CPC ............. *H04N 7/185* (2013.01); *H04N 5/225* (2013.01); *H04N 7/183* (2013.01); *H04N 7/188* (2013.01);
(Continued)

(58) Field of Classification Search
CPC .... H04N 7/181; H04N 5/23206; H04N 7/185; H04N 21/4223; H04N 7/18;
(Continued)

(56) References Cited

U.S. PATENT DOCUMENTS

| 4,494,854 A | 1/1985 | Yamaga et al. |
| 5,675,112 A | 10/1997 | Giry et al. |

(Continued)

FOREIGN PATENT DOCUMENTS

| EP | 1237373 A2 | 9/2002 |
| JP | 2003298917 A | 10/2003 |

(Continued)

OTHER PUBLICATIONS

Agan et al. (A Highly Miniaturized, Battery Operated, Commandable, Digital Wireless Camera, © IEEE, Oct. 19-21, 1998, (Year: 1998).*

(Continued)

*Primary Examiner* — Md N Haque
*Assistant Examiner* — Samuel D Fereja
(74) *Attorney, Agent, or Firm* — Volpe and Koenig, P.C.

(57) ABSTRACT

Systems, apparatuses, and techniques for video delivery can include one or more of the following: a wireless camera arranged in a wearable form factor comprising a battery to provide energy, and configured to generate a video feed, and a base station in wireless communication with the wireless camera and configured to receive the video feed from the wireless camera and process the video feed, and a video portal device communicatively coupled with the base station and configured to receive the processed video feed from the base station and deliver at least a portion of the processed video feed to one or more remote clients. A base station can reserve a wireless channel for the wireless camera for a video transmission.

36 Claims, 15 Drawing Sheets

Related U.S. Application Data

(60) Provisional application No. 61/023,369, filed on Jan. 24, 2008.

(51) Int. Cl.
*H04N 5/225* (2006.01)
*H04N 21/6373* (2011.01)
*H04W 72/12* (2009.01)
*H04N 21/4223* (2011.01)

(52) U.S. Cl.
CPC ..... *H04N 21/6181* (2013.01); *H04N 21/6373* (2013.01); *H04N 7/181* (2013.01); *H04N 21/4223* (2013.01); *H04W 72/1284* (2013.01)

(58) Field of Classification Search
CPC .. H04N 21/2187; H04N 7/183; H04N 5/2252; H04N 5/232; H04N 5/23241; H04N 5/765; H04N 5/772; H04N 7/188; H04N 21/6181; H04N 21/64322; H04N 21/2743; H04N 21/436; H04N 21/43615; H04N 5/225; H04N 1/00281; H04N 1/00315; H04N 2101/00; H04N 21/23106; H04N 21/4126; H04N 21/4135; H04N 21/42202; H04N 21/4788; H04N 21/6131; H04N 2201/0015; H04N 2201/0084; H04N 2201/33364
See application file for complete search history.

(56) References Cited

U.S. PATENT DOCUMENTS

| | | | |
|---|---|---|---|
| 5,784,629 | A | 7/1998 | Anderson et al. |
| 5,949,551 | A | 9/1999 | Miller et al. |
| 6,224,227 | B1 | 5/2001 | Klootz |
| 6,400,903 | B1 | 6/2002 | Conoval |
| 6,522,352 | B1 | 2/2003 | Strandwitz et al. |
| 6,600,917 | B1 | 7/2003 | Maupin |
| 6,970,183 | B1 | 11/2005 | Monroe |
| 7,131,136 | B2 | 10/2006 | Monroe |
| 7,173,197 | B1 | 2/2007 | Kasperek |
| 7,218,315 | B2 | 5/2007 | Takeuchi et al. |
| 7,251,232 | B1 | 7/2007 | Meier |
| 7,301,562 | B2 | 11/2007 | Belz et al. |
| 7,324,831 | B2 | 1/2008 | Haartsen |
| 7,428,002 | B2 | 9/2008 | Monroe |
| 7,809,013 | B2 | 10/2010 | Waxman |
| 7,812,855 | B2 | 10/2010 | Babich et al. |
| 8,050,206 | B2 | 11/2011 | Siann et al. |
| 8,121,078 | B2 | 2/2012 | Siann et al. |
| 8,208,024 | B2 | 6/2012 | Dischinger |
| 8,351,451 | B2 | 1/2013 | Patil et al. |
| 2001/0008415 | A1 | 7/2001 | Park |
| 2003/0052944 | A1 | 3/2003 | Auffret et al. |
| 2003/0107655 | A1 | 6/2003 | Ishizaka et al. |
| 2003/0112335 | A1 | 6/2003 | Strandwitz et al. |
| 2003/0122924 | A1 | 7/2003 | Meyers |
| 2003/0128130 | A1 | 7/2003 | Kao |
| 2003/0137588 | A1 | 7/2003 | Wang et al. |
| 2003/0197124 | A1* | 10/2003 | Wood ............... H01L 27/14625 250/332 |
| 2004/0001429 | A1 | 1/2004 | Ma et al. |
| 2004/0038169 | A1 | 2/2004 | Mandelkem et al. |
| 2004/0130624 | A1 | 7/2004 | Ryley et al. |
| 2004/0136388 | A1 | 7/2004 | Schaff |
| 2004/0143403 | A1 | 7/2004 | Brandon et al. |
| 2004/0169733 | A1 | 9/2004 | Ishizaka et al. |
| 2004/0171385 | A1 | 9/2004 | Haustein et al. |
| 2005/0004496 | A1 | 1/2005 | Pilu et al. |
| 2005/0104958 | A1 | 5/2005 | Egnal et al. |
| 2005/0128295 | A1 | 6/2005 | Addy |
| 2006/0064477 | A1 | 3/2006 | Renkis |
| 2006/0088018 | A1 | 4/2006 | Black et al. |
| 2006/0088092 | A1 | 4/2006 | Chen et al. |
| 2006/0171341 | A1 | 8/2006 | Wang et al. |
| 2006/0180668 | A1 | 8/2006 | Casey |
| 2006/0227997 | A1 | 10/2006 | Au et al. |
| 2003/0268979 | | 11/2006 | Chang |
| 2006/0268105 | A1 | 11/2006 | Jacobs et al. |
| 2006/0274166 | A1 | 12/2006 | Lee et al. |
| 2006/0280151 | A1 | 12/2006 | Sawada |
| 2007/0036074 | A1 | 2/2007 | Tsai et al. |
| 2007/0051872 | A1 | 3/2007 | Goldberg et al. |
| 2007/0058605 | A1 | 3/2007 | Mylann et al. |
| 2007/0076095 | A1 | 4/2007 | Tomaszewski |
| 2007/0076693 | A1 | 4/2007 | Krishnaswamy |
| 2007/0081796 | A1* | 4/2007 | Fredlund ............... G03B 31/06 386/225 |
| 2007/0098379 | A1 | 5/2007 | Wang et al. |
| 2007/0281617 | A1 | 12/2007 | Meylan et al. |
| 2007/0285510 | A1* | 12/2007 | Lipton ............... G08B 13/1961 348/135 |
| 2007/0287881 | A1 | 12/2007 | Akimov et al. |
| 2008/0043668 | A1 | 2/2008 | Chen et al. |
| 2008/0049666 | A1 | 2/2008 | Golash et al. |
| 2008/0122938 | A1 | 5/2008 | Broberg et al. |
| 2008/0192114 | A1 | 8/2008 | Pearson et al. |
| 2008/0288986 | A1* | 11/2008 | Foster ............... G08B 13/19656 725/62 |
| 2009/0019176 | A1 | 1/2009 | Debrosse |
| 2009/0027499 | A1 | 1/2009 | Nicholl |
| 2009/0036121 | A1 | 2/2009 | Bridges et al. |
| 2009/0042555 | A1 | 2/2009 | Zhu et al. |
| 2009/0174547 | A1 | 7/2009 | Greene et al. |
| 2009/0189981 | A1 | 7/2009 | Siann et al. |
| 2009/0225682 | A1* | 9/2009 | Grote-Lopez ......... H04L 41/083 370/255 |
| 2010/0208318 | A1 | 8/2010 | Jensen et al. |
| 2010/0284391 | A1 | 11/2010 | Ortiz et al. |
| 2011/0096168 | A1 | 4/2011 | Siann et al. |
| 2012/0147184 | A1 | 6/2012 | Siann et al. |
| 2012/0188072 | A1 | 7/2012 | Dawes et al. |
| 2012/0202565 | A1* | 8/2012 | Lapstun ............... B41J 3/445 455/556.1 |
| 2012/0258658 | A1 | 10/2012 | Matsuo |
| 2015/0130935 | A1 | 5/2015 | Siann et al. |

FOREIGN PATENT DOCUMENTS

KR   10 2005 0058316 A   6/2005
WO       02/30108 A1     4/2002

OTHER PUBLICATIONS

Kim, Sean Woo, Authorized Officer, Korean Intellectual Property Office, International Searching Authority, Written Opinion, in PCT International Application No. PCT/US2009/031908, dated Sep. 3, 2009, 11 pages.
Notice of Allowance dated Jan. 20, 2016 for U.S. Appl. No. 12/359,259.
Office Action dated Apr. 12, 2013 for U.S. Appl. No. 12/359,259.
Offcie Action dated Apr. 9, 2013 for U.S. Appl. No. 12/984,587.
Office Action dated Aug. 29, 2014 for European Patent Office Application No. 09703624.8.
Office Action dated Jan. 31, 2014 for European Patent Application No. 09703624.8.
Office Action dated Jun. 22, 2012 for U.S. Appl. No. 12/984,587.
Office Action dated Jun. 27, 2012 for U.S. Appl. No. 12/359,259.
Office Action dated Nov. 7, 2012 for U.S. Appl. No. 12/984,587.
Office Action dated Nov. 21, 2012 for U.S. Appl. No. 12/359,259.
Office Action dated Oct. 25, 2013 for U.S. Appl. No. 12/359,259.
Office Action dated Oct. 30, 2013 for U.S. Appl. No. 12/984,587.
Brief Communication issued on Jan. 18, 2019 for the European Patent Application No. 09703624.8.
Wei et al., "An Energy-Efficient MAC Protocol for Wireless Sensor Networks", vol. 3, Jun. 23, 2002, pp. 1567-1576.
Singh et al., "PAMAS-Power Aware Multi-Access Protocol with Signaling for Ad Hoc Networks", vol. 28, No. 3, Jul. 1, 1998, pp. 5-26.

(56) References Cited

OTHER PUBLICATIONS

"VPON SecuWatch 2:5 User Manual", Formosa21 Inc., www.vpon21.com, Jan. 2008.
Aach et al., "Bayesian Illumintation-Invariant Motion Detection", Procedings IEEE International Conference on Image Processing, 3:640-643, Oct. 2001
International Preliminary Report on Patentability, PCT/US2007/085308, dated May 26, 2009, 10 pages.
Jin Kim, International Search Report and Written Opinion, PCT/US2007085308, dated Jun. 3, 2008, 14 pages.
Hu et al., "An Efficient Joint Dynamic Detection Technique for Wireless Transmission of JPEG2000 Encoded Images", Proceedings of the 2006 International Conference on Wireless Communicatios and Mobile Computing, pp. 395-400, 2006.
Melange et al., "Low-Power, Super Regenerative Targets 433-MHz ISM band," Electronic Design News, p. 78, (Feb. 2006).
Notice of Allowance dated Aug. 23, 2011 for U.S. Appl. No. 12/515,691.
Office Action dated Apr. 12, 2011 for U.S. Appl. No. 13/022,644.
Office Action dated Jun. 22, 2011 for U.S. Appl. No. 12/515,691.
Office Action dated Jul. 15, 2013 for U.S. Appl. No. 13/397,715.
Office Action dated Jan. 13, 2014 for U.S. Appl. No. 13/397,715.
Office Action dated Aug. 4, 2014 for U.S. Appl. No. 13/397,715.
Notice of Allowance dated Oct. 24, 2011 for U.S. Appl. No. 13/022,644.
European Office Action, EP Patent No. 7 868 814.0, Office Action dated Feb. 15, 2018, 4 pages.
Summons to attend oral proceedings pursuant to Rule 115(1) EPC issued on Oct. 25, 2018, for the European Patent Application No. 07868814.0.
"Variable bitrate," From Wikipedia, the free encyclopedia, Available at: https://en.wikipedia.org/w/index.php?title=Variable_bitrate&oldid=3782946 (Apr. 24, 2004).
Doring, "Requirements for the ideal CCTV video codec," Technical report, Geutebruck Technical Report (2006).
Result of Consultation issued on Oct. 12, 2018 for the European Patent Application No. 09703624.8.

\* cited by examiner

VIDEO DELIVERY SYSTEMS USING WIRELESS CAMERAS

CLAIM OF PRIORITY

This application is a continuation of U.S. patent application Ser. No. 12/359,259 filed Jan. 23, 2009, which claims the benefit of U.S. Provisional Application No. 61/023,369 entitled "VIDEO DELIVERY SYSTEMS USING WIRELESS NETWORK CAMERAS" and filed on Jan. 24, 2008, which is incorporated by reference as part of the disclosure of this document.

BACKGROUND

This document relates to video delivery systems and techniques using wireless cameras.

Network camera systems can be based on the Internet Protocol (IP) and use Ethernet based networking technology. In some applications, network camera systems are replacing analog closed circuit television (CCTV) due to various factors, such as accessibility, ease-of-use, cabling scalability, and lower cost of deployment and operation. With the ubiquity of wireless networks such as WiFi networks, e.g., based on IEEE 802.11 standards, and the emerging WiMAX networks, e.g., based on IEEE 802.16 standards, wireless network camera systems are gaining popularity and are expected to become the dominant platform for video surveillance applications.

In an IP surveillance environment, the network camera system can include IP cameras connected via twisted pair cabling to a network switch. Alternatively, the network connection can be achieved using wireless local area networking (LAN) technology; e.g., the IEEE 802.11b standard. In various applications, IP cameras can include a web-server capability and remote clients or observers connected to the camera via standard TCP/IP interface standards such as FTP or HTTP. IP based network camera systems can be designed using commercial off-the-shelf (COTS) components from a diverse number of suppliers.

SUMMARY

This document describes various aspects relating to video delivery systems using wireless cameras and methods of providing such systems.

Systems, apparatuses, and techniques for video delivery can include one or more of the following: a wireless camera arranged in a wearable form factor including a battery to provide energy, and configured to generate a video feed, and a base station in wireless communication with the wireless camera and configured to receive the video feed from the wireless camera and process the video feed, and a video portal device communicatively coupled with the base station and configured to receive the processed video feed from the base station and deliver at least a portion of the processed video feed to one or more remote clients.

Systems, apparatuses, and techniques for video delivery can include a wireless camera arranged in a wearable form factor including a battery to provide energy and a base station in wireless communication with the wireless camera. The wireless camera can be configured to generate a video feed, operate a first radio to transmit at least a portion of the video feed over a first wireless channel, and operate a second radio in a polling mode to receive information over a second wireless channel. The base station can be configured to receive the video feed from the wireless camera. The base station can reserve the first wireless channel for the wireless camera by transmitting on the first wireless channel, wherein the base station transmits information to the wireless camera over the second wireless channel to instruct the wireless camera to transmit on the first wireless channel at a known time. The base station can be configured to process the video feed and deliver the processed video feed to a video portal for remote viewing of the video feed.

These, and other aspects, can include one or more of the following features. The base station can be configured to detect an availability of a wireless channel using a carrier sense multiple access/collision avoidance (CSMA/CA) protocol, transmit a wireless signal to a surrounding node within wireless range of the base station to cause the surrounding node to remain silent on the wireless channel, transmit a signaling message signaling the availability of the wireless channel to the wireless camera to cause the wireless camera to respond with a wireless video data message including at least a portion of the video feed. A size of the wireless video data message can be greater than a size of the signaling message, e.g., by at least a ratio of 100 to 1. Systems can include a vehicle to house one or more base stations.

The wireless camera can include a first radio to transmit at least a portion of the video feed to the base station over a first wireless channel, and a second radio that uses a polling mode to receive information from the base station over a second wireless channel. The wireless camera can include a burst transmission unit to transmit information, corresponding to burst periods, to the base station, wherein the burst transmission unit generates orthogonal frequency division modulation (OFDM) transmission symbols. The burst transmission unit generates the transmission symbols corresponding to one of 24 Mbps, 36 Mbps, 48 Mbps, 54 Mbps, and 65 Mbps data rates. The burst transmission unit can generate the transmission symbols corresponding to a data rate that exceeds 22 Mbps. The burst transmission unit of the wireless camera can include multiple output circuits with respective different power amplifier bias settings. Each of the output circuits can include a power amplifier and antenna matching circuitry. The burst transmission unit can be configured to select one of the output circuits for data transmission based a wireless link condition. The base station can reserve the first wireless channel for the wireless camera by transmitting on the first wireless channel. The base station can transmit information to the wireless camera over the second wireless channel to instruct the wireless camera to transmit on the first wireless channel at a known time. The wireless camera can include a user control to indicate an event of interest to the base station. The video portal device can access the wireless camera, wherein the wireless camera generates a user alert based on the access. The wireless camera can include a capacitor holding circuit to increase battery life while allowing for current surges when transmitting to the base station. The second radio of the wireless camera can include a direct-sequence spread spectrum (DSSS) receiver. The second radio in the wireless camera can be configured to operate continuously for periods of time exceeding five hours while drawing less than 50 microwatts in average power.

Systems, apparatuses, and techniques for video delivery can include a wireless camera node that includes an image sensor for capturing video and a base station to operate a transceiver, detect an availability of a wireless channel using a carrier sense multiple access/collision avoidance (CSMA/CA) protocol, transmit a wireless signal to a surrounding node within wireless range of the base station to cause the surrounding node to remain silent on the wireless channel, transmit a signaling message signaling the availability of the wireless channel to the wireless camera node to cause the wireless camera node to respond with a wireless video data message. The base station can be configured to receive and process video from the wireless camera node for remote viewing.

These, and other aspects, can include one or more of the following features. In some implementations, the CSMA/CA protocol is based on a 802.11 standard. A size of the wireless video data message can be greater than a size of the signaling message, e.g., by at least a ratio of 100 to 1. The wireless camera node is configured to operate a receiver capable of receiving the signaling message for one or more periods of time averaging less than 5% of elapsed time during extended periods of video transmission. The wireless camera node can use a 2.4 GHz radio spectrum to transmit the wireless video data message. The wireless camera node can use Orthogonal Frequency Domain Modulation (OFDM) to transmit the wireless video data message. The wireless camera node can be powered by sources such as a battery or solar power. The wireless camera node can be arranged in a wearable form factor and can weigh less than 100 grams, or less then 50 grams.

A wireless camera can include an image sensor for capturing video, a first radio to transmit video to a base station over a wireless channel, wherein the base station is configured to reserve the wireless channel by transmitting on the wireless channel, a second radio to receive communications from the base station and a controller in communication with the image sensor, the first radio, and the second radio, wherein the controller is configured to operate the first radio to transmit a video feed to the base station in response to receiving the signaling message. The second radio of the wireless camera can be configured to operate in a polling mode to receive a signaling message signaling an availability of the wireless channel.

Systems, apparatuses, and techniques for video delivery can include obtaining video from one or more battery powered and wearable wireless cameras, each of the one or more battery powered wireless cameras including an internal battery to provide energy; transmitting the obtained video to a base station that is separated from the one or more wireless cameras and in wireless communication with the one or more wireless cameras; processing the obtained video in the base station; and transmitting the processed video for remote reviewing.

These, and other aspects, can include one or more of the following features. Implementations can include charging a remote client for accessing the video portal to watch video from the one or more wireless cameras. Transmitting the processed video to a video portal can include transmitting the processed video over a wireless network. Implementations can include receiving a command from the video portal to access one of the wireless cameras. Implementations can include operating the accessed wireless camera to generate an alert to notify a user of the video portal's access. Implementations can include transmitting a message on a wireless channel to reserve the wireless channel for transmission of the obtained video. The message can include clear-to-send (CTS)/self signaling information. Transmitting the processed video for remote reviewing can include transmitting the processed video to a video portal.

The systems and techniques described herein can provide wireless IP video systems that require no power cable and can potentially operate on standard off-the-shelf battery solutions for over a year. In addition, the systems and techniques described herein can resolve the interference, interoperability and reliability problems currently associated with existing wireless camera systems. Video delivery systems can be provided by using low-cost, battery-powered, and wearable wireless cameras connected to a base station, such as a video hub or video engine. In addition, a video portal device can connect with one or more base stations and function as a video hosting server that allows for multiple remote viewing through one or more wireless cameras.

The subject matter described in this specification can be embodied in a system that includes a battery powered wireless camera including an internal battery to provide energy and a burst transmission unit to transmit information corresponding to burst periods. The system also includes a base station, separated from the battery powered wireless camera, in wireless communication with the battery powered wireless camera to receive information from the battery powered wireless camera. The base station is configured to process the received information and includes a web server to relay the processed information to a client. Other embodiments of this aspect include corresponding methods, apparatus, and computer program products.

The subject matter described in this specification can be embodied in a wireless camera system which includes a battery powered wireless camera including an internal battery to provide energy and a burst transmission unit to transmit information corresponding to burst periods. The system also includes a base station, separated from the battery powered wireless camera, in wireless communication with the battery powered wireless camera to receive information from the battery powered wireless camera. The base station is configured to process the received information and including a web server to relay the processed information to a client, and the base station is powered by a power cable connected to an external power source. The burst periods are determined based on at least one of a wireless link channel average bandwidth capacity, a fidelity of images transmitted, and a latency of establishing and tearing down a wireless connection between the battery powered wireless camera and the base station.

The subject matter described in this specification can be embodied in a system that includes a base station which includes a first receiver configured to receive information in a first wireless network and a second transmitter configured to transmit information in a second wireless network. The system also includes a remote node which includes a first transmitter configured to transmit information in the first wireless network and a second receiver configured to receive information in the second wireless network. The second transmitter is further configured to transmit control information from the base station to the remote node via the second wireless network and the first transmitter is further configured to transmit compressed video information from the remote node to the base station via the first wireless network. Additionally, the second receiver in the remote node is further configured to operate for substantially longer period of time than the first transmitter in the remote node.

The subject matter described in this specification can be embodied in a method that includes transmitting information, by one or more battery powered wireless cameras having internal batteries in a wireless link. The transmitting of information corresponding to burst periods. The method also includes receiving information by a base station, and the base station includes a web server. The method further includes processing the received information in the base station, and relaying, by the web server, the processed information to a client.

In another aspect, a wireless camera system includes a battery powered wireless camera having an internal battery to provide energy and a burst transmission unit to transmit information corresponding to burst periods. The system also includes a base station, separated from the battery powered wireless camera, in wireless communication with the battery powered wireless camera to receive information from the battery powered wireless camera. The base station is configured to process the received information and the burst periods are determined based on at least one of a wireless link channel average bandwidth capacity, a fidelity of images transmitted, and a latency of establishing and tearing down a wireless connection between the battery powered wireless camera and the base station.

In a further aspect, a wireless camera system includes a solar powered wireless camera that includes at least one solar cell. The system also includes a base station, separated from the solar powered wireless camera, in wireless communication with the solar powered wireless camera and configured to receive information from the solar powered wireless camera. The base station is further configured to process the received information and includes a web server to relay the processed information to a client.

In one aspect, a wireless camera system includes a battery powered wireless camera that includes a power unit for energy source and a burst transmission unit to transmit information corresponding to burst periods. The system also includes means for determining the burst periods for transmission of information. The system further includes a base station configured to receive information from the battery powered wireless camera and to process the received information. The base station includes a web server to relay the processed information to a client. The system additionally includes a first wireless link configured to connect the battery powered wireless camera and the base station.

In another aspect, a network camera includes a networking module configured to communicate with a network. The network camera also includes an image capturing module configured to capture images. The network camera further includes an image compression circuit configured to compress the captured images. The network camera additionally includes a privacy lens cap or a visible shutter configured to enhance privacy and prevent the image capturing module from capturing images. The network camera can be a wired or a battery powered wireless camera that includes an internal battery.

In yet another aspect, a network camera includes a burst transmission unit configured to transmit information corresponding to burst periods and a networking module configured to communicate with a network. The network camera also includes an image capturing module configured to capture images. The network camera further includes an image compression circuit configured to compress the captured images. The network camera additionally includes a privacy lens cap or a visible shutter configured to enhance privacy and prevent the image capturing module from capturing images. The network camera can be a wired or a battery powered wireless camera that includes an internal battery.

These and other embodiments can optionally include one or more of the following features. For example, a plurality of cameras can be associated with one base station. A plurality of cameras can be associated with two base stations to provide redundancy in case one of the base stations fails. Furthermore, a plurality of cameras can be associated with a plurality of base stations in a mesh architecture to maximize redundancy, resiliency and low power operation. The internal battery can be configured to provide energy without a power cable connected to an external power source that is external to the camera.

The base station configured to receive information from the one or more battery powered wireless cameras can include scanning one or more communication channels for channel availability between the base station and the one or more battery powered wireless cameras; obtaining an available channel for data transmission based on the scanning of channel availability; and associating the available channel with a specific one of the one or more battery powered wireless cameras. The associating of the available channel can include reserving the available channel for a predetermined period of time, and assigning the reserved available channel to the specific one of the one or more battery powered wireless cameras. In addition, during the predetermined period of time, the available channel can appear to the other one or more battery powered wireless cameras as unavailable for wireless communication.

Each of the one or more battery powered wireless cameras can include a scanning circuitry configured to scan the one or more communication channels for channel availability and to determine available channels for data transmission. Each of the one or more battery powered wireless cameras can also include a storage device configured to store data when there are no available channels for data transmission. The wireless network camera system can also include a network connecting the base station and the client, and the client can include a video surveillance application to display video images. The network can be one of a wired Ethernet network, or a wireless network such as a WiFi network or a WiMAX network. The transmitted information can include compressed video signals or digitally encoded video signals.

Each of the one or more battery powered wireless cameras can include an image sensor configured to produce an image; an image compression circuit configured to compress a digital file of the image produced by the image sensor; and a substrate configured to monolithically integrate the image sensor and the image compression circuit. The burst periods can be determined based on at least one of a wireless link channel average bandwidth capacity, the fidelity of images transmitted, and a latency of establishing and tearing down the wireless link. The burst periods can be further determined based on a trigger event caused by one of a sound detection, an infrared motion detection, an ultrasonic detection, a radio signaling circuitry, and a channel availability for data transmission.

The wireless network camera system can include a first wireless network configured to communicate between the one or more wireless cameras and the base station via one or more high-bandwidth channels. The wireless network camera system can also include a second wireless network configured to communicate between the one or more wireless cameras and the base station via one or more low-bandwidth channels. The second wireless network can be configured to be more reliable and/or more available (e.g., operates for a longer period of time) than the first wireless network.

Both the first and second wireless networks can be one of a wireless Ethernet network, a WiFi network, and a WiMAX network. In addition, both the first and the second wireless networks can be based on Multiple In Multiple Out (MIMO) technology. The second wireless network can be configured to operate for an extended period of time to facilitate one or more of set-up, installation, and troubleshooting activities. The second wireless network can also be used to signal to the one or more wireless cameras that one of the one or more high-bandwidth channels is available for data transmission. The channel availability information of the one or more high-bandwidth channels can be determined by processing in the base station.

The base station can include a transmitter configured to transmit via the second wireless network information that includes one or more of positional, zoom, and tilt commands to each of the one or more wireless cameras. The base station can also include a transmitter configured to transmit via the second wireless network a command to flush information and data stored on each of the one or more wireless camera through the first wireless network. Each of the one or more battery powered wireless cameras can include a high-bandwidth transceiver and a low-bandwidth transceiver.

The high-bandwidth transceiver can be configured to receive information via the first wireless network and the low-bandwidth transceiver can be configured to receive information via the second wireless network. The low-bandwidth transceiver can be configured to consume less than 4 mW of power in constant operation or operate in a polling mode that reduces an average energy consumption of the camera. The base station can include timing circuits configured to be synchronized with the cycle of the polling mode in the receiver.

Each of the one or more battery powered wireless cameras can include a storage device configured to store the information at a first fidelity. The information can be transmitted to the base station at a second fidelity, and the first fidelity is different from the second fidelity. The one or more wireless cameras can be configured to be powered up to obtain information in response to a trigger event caused by one of a sound detection, an infrared motion detection, an ultrasonic detection, a video processing based movement detection, a relay switch, a micro switch, and a radio signaling circuitry. Each of the one or more wireless cameras can further include a storage device configured to store captured information for a predetermined period of time. The stored captured information can be transmitted to the base station in response to a trigger event.

Each of the one or more wireless cameras can include a first switch configured to control one or more of operation in darkness, operation based on sound detection, operation based on infrared motion detection, operation based on ultrasonic detection, and operation by triggers; and a second switch configured to indicate operation duration of the one or more wireless cameras. A frame rate can be obtained based on the operation duration so that the internal battery can last substantially for the operational duration indicated by the switch.

Each of the one or more battery powered wireless cameras can further include an uncompressed image capture module configured to operate based on periods that are different from the burst periods. The image capture rate and the burst transmission rate can be based on motion detection, and further wherein when motion is detected in the captured images, the image capture frame rate is increased, and when motion is not detected in the captured images, the image capture frame rate is decreased.

The internal battery of the wireless camera can be based on one or more of solar cells, fuel cells, galvanic cells, flow cells, kinetic power generators, and environmental energy sources. The internal battery output voltage can be boosted or regulated by an active power management circuitry. The internal battery can be recharged by one or more of solar cells, fuel cells, galvanic cells, flow cells, kinetic power generators, and environmental energy sources. The internal battery can include an array of rechargeable battery cells configured to extend the useable lifetime of the rechargeable array to be greater than a lifetime of a single rechargeable battery cell, and less than the entire array of rechargeable battery cells are used at a given time.

The useable lifetime of the internal battery can be extended by controlling the current withdrawal of the rechargeable battery cells to within a predetermined current limit. The controlling of current withdrawal from the internal battery can be performed through a high efficiency regulation circuit that includes a switching regulator for drawing a limited current flow from the battery cells, and a capacitor for temporary storage of energy. The internal battery can be replaced by a high capacity capacitor and a charging circuitry associated with the capacitor. The internal battery can include at least a high capacity capacitor and a rechargeable battery.

Each of the one or more battery powered wireless cameras can include a compression module configured to operate based on periods that are different from the burst periods. Each of the one or more battery powered wireless cameras can capture and transmit audio information and sensor information. Each of the one or more battery powered wireless cameras can be surface mountable and can include a housing that has a solar panel configured to recharge the internal battery.

Particular aspects can be implemented to realize one or more of the following potential advantages. A fundamental architectural change in the wireless camera can be implemented to obtain significant power savings in wireless network camera systems. Such fundamental change can offer substantial power savings over commonly understood power-reducing techniques such as using more efficient electronic components in the radio transceivers, image capture, and compression integrated circuits.

An ultra-low power wireless camera can be obtained without compromising the ability of new and existing client system to access data using standard IP connections and standard or de-facto application programming interfaces (APIs). In particular, the base station code can comply with well established IP camera API's. Additionally, even though the wireless camera can operate at an ultra-low average power, during the burst period when the camera is transmitting data to the base station, the camera can allow for power consumption in excess of 100 mW. This is in contrast to existing wireless sensors which will typically consume less than 100 mW of power when transmitting data.

Multiple wireless cameras (e.g., up to 16 wireless cameras) can be assigned to a single base station. The base station and wireless camera combination can deliver all the intelligence and features expected for a commercial grade IP camera solution. The solution integrates into existing IP networks and exposes standard video monitoring application interfaces so that popular video surveillance data applications can be used. This makes for rapid, seamless and pain free deployment. From the network perspective, the combo processing ensures that all wireless cameras appear to be 100% compatible IP cameras. Video can be delivered compressed to industry standard format such as MJPEG or MPEG-4, ready to be accessed and managed by industry standard software.

The base station can connect to a regular wired Ethernet LAN and on to the Internet, just like any IP surveillance system. A seamless integration can occur over a standard 802.11b/g/n wireless Ethernet network. Since it can be wireless to the Internet access point, the distance range of the wireless network camera system can be as wide as today's wireless systems. The user can perform a walkthrough wizard once, and begin installing multiple security cameras anywhere within the range of the base station.

Further, a battery powered wireless camera operation can be achieved using well established components. Battery powered wireless network camera systems can be achieved without additional external power source or cabling. These systems can have standard web server capability for client access to the captured data. Because no power cabling is needed, these battery powered wireless network camera systems can be deployed in locations where previously difficult to service. Camera operation for extended periods of time can be obtained using small battery packs.

By using modified media access techniques, unreliable or inconsistent connectivity associated with the standard IEEE 802.11 wireless links can be avoided. Additionally, the erratic set-up and/or operation of a wireless link due to interference or other environmental factors can be minimized. The drawbacks of the IEEE 802.11 MAC standards in poor connection conditions can be overcome by observing interference and also using techniques to reserve and hold a connection for data transmission. For example, by implementing a second low-bandwidth radio/transceiver in the wireless camera, the modified media access techniques can be triggered and controlled through the second radio. The low-bandwidth radio can establish a link in conditions where the high-bandwidth radio/transceiver cannot.

By incorporating more functionality in the base station of the wireless network camera system, the base station can detect and correct link problems by requesting retransmission of the captured data. Such request can be sent via the low-bandwidth radio which can be more reliable and use lower power than the high-bandwidth radio. This retransmission can be hidden and transparent to the client surveillance application through the virtual web server or relay server in the base station. In addition, image and video analytical functions such as object recognition, people counting, and license recognition can be implemented in the base station rather than the camera. These analytical functions can be implemented in a hidden way so that it logically appears to the client that these functions are occurring in the camera. Furthermore, in applications where privacy of the image or audio data needs to be protected, the data transmitted wirelessly can be encrypted.

These aspects may be implemented using a system, method, or a computer program product, or any combination of systems, methods, and computer program products. The details of one or more embodiments are set forth in the accompanying drawings and the description below. Other features, aspects, and advantages will be apparent from the description, the drawings, and the claims.

DESCRIPTION OF DRAWINGS

Like reference symbols in the various drawings indicate like elements.

DETAILED DESCRIPTION

Figure 1A:
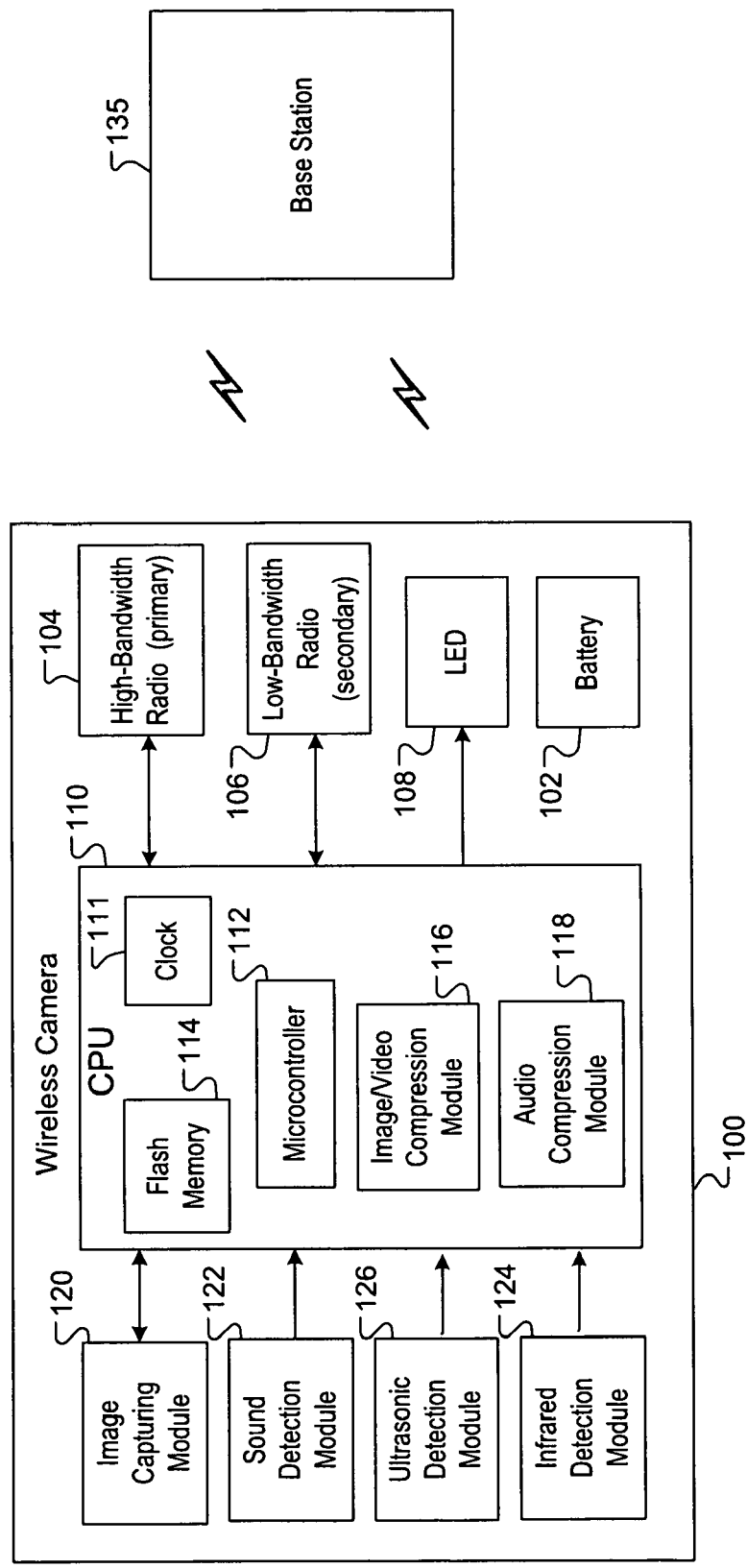
FIG. 1A shows an example of a battery powered wireless camera.

The systems and techniques described herein relate to providing video delivery systems using low-cost, battery-powered, and wearable wireless cameras connected to a base station, such as a video hub or a video engine. In addition, a computer system such as a video portal device or a server configured with a video portal software suite can connect with the base station and can function as a video hosting server that allows for multiple remote viewing through one or more wireless cameras.

A video delivery system can include one or more wireless cameras, a base station (e.g., a video hub, video engine, access point), and a video portal server or processing device configured to run a video portal software suite. Wireless camera features may include low-cost hardware, battery-powered, and wearable aspects. For example, the wireless camera can run on low voltage batteries, e.g., hearing aid batteries, and provide power for eight hours or more including a full year of operation depending on the form factor of the wireless camera. A wireless camera can include a holding capacitor or similar circuitry to allow for current surges without degrading the battery life when transmitting from the camera to a base station. In addition, such a holding capacitor or similar circuitry can allow smaller battery cells with lower peak power delivery capabilities to be used.

The wireless cameras can allow users to perform various functions, e.g., functions that adjust or control a camera operation. User control for wireless cameras in a wearable form factor can include start transmitting, stop transmitting, increase/decrease frame rate, zoom in/out, send signal to base station/video hub that an event of interest is occurring, and sending an alarm to the base station. A wearable wireless cameras can have a small form factor. Such a form factor can include a one touch button or one or more multifunction buttons. A wireless camera may be arranged in different form factors such as different shapes and sizes and can include interchangeable ear pieces elements to make the wearable camera user more comfortable.

The systems and techniques described herein can allow a wearable wireless cameras to operate at a sustained basis of 30 frames per second with DVD quality, with transmitted power during data transmission of around 12 dBm, and with an average power consumption of less than 100 mW or even less than 50 mW. For these types of higher frame rates, using capacitor holding circuits, a few small hearing aid sized button sized battery cells can be used to allow the wearable camera to be active for 8 hours or more. Additionally, for privacy measures, a highly visible privacy lens cap can be integrated on the wearable camera so that it is clear to people around the camera that the lens is obscured and cannot be capturing useful video. Furthermore, in some implementations, the wearable camera can be powered by rechargeable batteries. These rechargeable batteries can be recharged using inductive coupling techniques, or through the use of a miniature USB-style connector.

The systems and techniques described herein can benefit many types of activities including law enforcement, military, paramedics, consumer, and sports. A wireless camera can include components for capturing images, videos, series of images, and audio. Different types of professionals such as law enforcement officers (LEOs), military personnel, paramedics, and emergency response personnel may record and/or transmit live audio and video of events in the field for supervision of such events and/or liability mitigation of events in the field.

The systems and techniques described herein can allow a wireless camera to be worn on a person without cables for power or data recording. A person may wear a wireless camera in one of many styles such as on the ear (similar to a Bluetooth headset), on clothing such as a hat or helmet, or attached to a shirt, jacket, or belt. In some implementations, a wireless camera can be integrated into glasses, badge, radio microphone, ball point pen, tie pin, or button; or attached to a gun or flashlight. Additional wireless cameras may be placed on different people or equipment involved in an activity.

The systems and techniques can benefit different types of consumer uses such as personal video or audio recording or live video transmission/streaming to the Internet from a wireless camera worn by a person. Examples of consumer uses include capturing video or images at family events or vacations (birthdays, sports games, parties, graduations, etc.), capturing action activities, streaming video feedback from a wearable wireless camera to an Internet site such as a social networking site, monitoring children, recording from a user's view point for school projects, work projects, or proof of performance requirement. Other uses are possible.

Sport based uses can include recording or transmitting live feeds of audio and video of sports games and activities from a player's viewpoint. The systems and techniques can post the feeds to the Internet or recorded for future use. In sports such as vehicle and motor or push bike racing, a wireless camera may be worn by a rider or driver and communicate a video feed to a base station placed at a convenient position in relationship to the bike or vehicles. For sports such as skiing, snow boarding, skateboarding, or push bike riding, a user may attach a wearable wireless camera to his clothes or equipment to transmit a video feed to a base station. The base station can re-transmit the video feed to a network such as the Internet. In some sporting events, a wireless camera may be attached to vehicles such as a race car, motorcycle, or boat. Other uses are possible.

A wireless camera can wirelessly communicate with a device such as a video base station, mobile device or smartphone configured to communicate with the camera, to record, further transmit or broadcast video via a wireless air link such as WiFi or cellular network. Furthermore, a base station may be wearable or located in a secure place in proximity to a wireless camera (e.g., within a 1,000 meters or a mile). In some implementations, a base station can be integrated into a vehicle such as a LEO vehicle, military vehicle, or ambulance. The base station can communicate with other base stations for sharing images or video. A video base station can manage one or more wireless cameras, e.g., on multiple users, devices, equipment, or combinations thereof.

A wireless camera operator may turn on or off the wireless camera or allow or disallow transmission of live video and audio. For example, a paramedic may enable his wireless camera to transmit video of the patient while en route to a hospital. Medical personnel at the hospital can use a remote reviewer, such as a computer or mobile device, to receive the video transmission so that medical personnel can view injuries and status of a patient during field treatment and transport so that they are prepared for the patient's arrival. In a different example, players of a sports game may wear a wireless camera and transmit play feed to games officials such as referees via a base station. Referees can use a remote viewing device to connect to a base station to download and review the play feed to make game determinations.

A wearable wireless camera can include batteries such as AA, AAA, or hearing aid style batteries. A wireless camera can include a rechargeable battery. In some implementations, a wireless camera can integrate with a one-way or two-way audio link to a camera wearer. For example, if the wearable camera is implemented in the form of a "Bluetooth" style headset, the audio link can be implemented, and such a link could also be engineered to be somewhat private to the camera wearer. The wearable camera can include a microphone to capture audio. Such a microphone can be optimized to capture sound within the camera's field of view using well established techniques to localize and focus the microphone's sensitivity. Acoustic noise shields can also be employed to further enhance the audio channel quality.

In other implementations, a handheld remote control can wirelessly communicate with a base station or a wearable camera to control the camera or base station functions, and allow remote operation of the video system. The base station can include video processing, features and adjustments that would normally be found in traditional video camcorders. Information regarding these features can be transmitted to the wearable camera via a communications link. For example, a video processing, features, or adjustments operation can include view finder, optical or digital zoom, face detection, image stabilization, video review modes where previously stored video can be reviewed, video editing operations, titling, video/special effects, face detection, digital of optical zoom, setting of aperture or shutter speed priority, white balance, resolution, frames per second, and auto focus modes of operation Alerts such as "this camera is being actively accessed" can be sent by or thorough the base station/video hub to the wearable wireless camera. Such alerts might be manifested on the wearable camera using an audio link or by a vibration of the wearable camera. A wireless camera can also be developed to easily fit into or attach to various items of clothing and jewelry such as: neck ties or bow ties, necklaces, hats, baseball caps, earrings, headpieces, sun glasses, jackets and similar items. A wireless camera can accommodate snap-on colored or patterned casings which can be swapped by the user for personal or appearance preferences. A wireless camera can be ruggedized to allow use in wet and harsh weather conditions. A wireless camera can be sealed to withstand water or chemical submersion. In certain implementation, A wireless camera can be integrated with a location-sensing capability using, e.g., GPS or triangulation of wireless signals. In this manner, the video system can determine the approximate location of the wearable camera so that the wearer can be located.

A base station can include a universal video hub that supports wireless cameras, as well as legacy cameras (e.g., analog, or wired IP cameras). The base station can also have an optional LCD screen and keyboard to allow for a local viewing of the wireless cameras on the base station. In addition, the base station can include a video bandwidth shaping functionality, such as tiling of videos so that multiple video images can fit on a single screen, and reducing the resolution of the video images so that more video images can be delivered to the remote clients. The base station can also include an interface to a proprietary web portal, which is a proprietary link different from the standard HTTP link. The base station can further include a web cam interface that allows the wireless cameras to function as mobile or wireless web cams. Furthermore, the base station can include the video encoder so that the images can be displayed, e.g., on an analog TV or on an HDTV. The functionalities of the base station can also be integrated with a portable device, such as a cellular phone or a PDA, through a combination of software and hardware integration.

The base station can communicate with a video portal software suite/device through a broadband wireless data or cellular network such as broadband 3G, CDMA, EVDO, HSDPA or similar modem chipset implemented through a USB, PCI-Express or PCMCIA card interfaces. The base station can also implement video traffic shaping functions such as reducing the data received form the cameras into a lower resolution video stream before transferring the video feeds onto the Internet. Furthermore, the base station can also process the video streams to exploit the limited bandwidth into the Internet. For example, the base station can multiplex various video feeds into a tiled arrangement in one video so that end users can view multiple cameras simultaneously on a single video feed. The base station can retain high quality recordings from all cameras simultaneously storing these recording on a local storage device such as a flash memory or a hard drive. These recording can be retrieved for future transmission, review, or editing.

A video portal device can serve as a video hosting server and can allow multiple remote clients to view video feeds from the wireless cameras. In this manner, more bandwidth is provided for the video delivery system because only one upload is needed from the base station and images from multiple wireless cameras can be aggregated at the video portal device. Furthermore, a video delivery system including a base station and separate video portal device can increase system reliably because the video portal device can function as the "man in the middle" to avoid connection problems associated with firewalls.

A video delivery system may provide multiple revenue sources. For example, the video delivery system can implement a live "micro pay-per-view" event to allow remote clients an opportunity of viewing a live event through one or more wireless cameras. In addition, the video delivery system can potentially draw a large audience into the video portal and allow for advertising revenues such as pay per click. Furthermore, the video delivery system can be part of a mobile carrier service by sharing a percentage of the subscription or data usage revenue with the mobile carriers.

For example, the wireless network camera systems described herein can operate for an extended period, e.g., months or even years without maintenance in certain applications. By looking at the energy requirements of the system over time, the systems and techniques described herein can use a time-sliced energy cycling technology to distribute processing over time and location. Furthermore, the systems and techniques described herein can combined with modern, available wireless technologies (such as the modulation schemes deployed in systems like WiFi 802.11) and off-the-shelf advanced semiconductor components. As a result, an overall reduction in the camera power of two or more orders of magnitude can be achieved. For example, the wireless camera described herein can potentially operate on less than 3 mW of power on a sustained basis, and the wireless camera can run over 12 months using 8 AA Lithium batteries.

Connection from the base station to other IP security video cameras and network can be done via wired or wireless links. Each wireless camera connected to the base station can be assigned an IP address from the Ethernet router through the regular DHCP or other standard Ethernet methods. Further, each wireless camera in the network behaves like a regular IP camera to any existing client or application on the LAN. In this way, each wireless camera can be addressable through industry standard APIs so that each video stream and each wireless camera can be viewed, recorded, and manipulated individually without any modifications to existing applications and hardware.

Numerous applications, such as alarm verification and surveillance applications for constructions sites, mobile transportation, and border patrol may use the wireless network camera systems described herein Construction Sites Construction theft is widespread and nothing new, but the amount of theft is increasing. Construction thefts, which are rarely solved, can lead to construction delay, higher costs and insurance rates, and higher home prices. The National Association of Home Builders estimates that the construction theft problem costs the US building industry $4 billion annually and increases the cost of the average home by 1.5 percent. Some builders try to protect themselves by using bind tools and materials into heavy heaps or block driveways. Most install temporary locks on windows and doors and wait until the last minute to install appliances.

Installing traditional video security cameras can be difficult because power is unlikely to be available at the location best served by the video camera. Most builders are unwilling to invest the dollars for a temporary installation. In addition, cabling for a network camera system can be impractical at the construction site. The wireless network camera systems described herein can offer a solution to this problem. Wireless cameras can be quickly added and moved during the construction phase, and theft activity can be identified in real-time. Since the cameras are temporary, the builder can re-use the cameras at other new construction site, decreasing the initial investment for a total security system to cover all construction projects.

Mobile Transportation

Without proper measures, public transit vehicles, school buses, light rail cars, and trains can be affected by security issues involving passengers and operators. Problems such as vandalism, assault and even suspicious liability claims can affect or disrupt an operation. While there are mobile surveillance systems, they require an on-board DVR which can be cumbersome and difficult to retrofit into an existing transportation vehicle. In addition, the existing system may not provide real-time information to a central monitoring station. The wireless network camera systems described herein can alleviate this problem with a low installation cost, and very little additional equipment to install.

With protected dome cameras at multiple locations on the transportation vehicle, a broad coverage can be enabled, while providing an avenue for central monitoring through a 3G IP based data network. The base station can store images temporarily should an interruption occur through the 3G network preventing immediately transfer of images. With the temporary storage at the base station, a near real-time video security monitoring can still be obtained with a very cost effective system. Video recording can be done at the central location, providing the benefits of immediate access to security officials, elimination of daily video transfer for historical recordkeeping and leveraging lower storage costs at the central facility.

Military and Border Patrol

In a war zone, there is no time and too much risk to install video surveillance systems. In terms of security, there is no greater need than in military applications for quick, reliable and secure mobile video security systems that can be centrally monitored. Lives can be saved in identifying rogue activity and quickly responding to potentially dangerous scenarios before an enemy can act. In most regions of interest, there is no power availability and the lack of a surveillance capability can be detrimental to securing the perimeter. If a security threat cannot be identified and responded to before it is too late, then the effort for enforcing barriers and preventing unauthorized access can be severely hampered. Using the wireless network camera systems described herein, the perimeter can be visually monitored without risk to military personnel.

With the vast expanses that a border patrol monitors, it is impossible to visually monitor all activity using border patrol agents. Using the wireless network camera systems described herein, remote monitoring of border regions can be achieved. A larger number of vital regions of the border can be monitored for unauthorized access using the same number of border agents, providing cost savings while improving efficiency. By integrating internal video analytics software, dynamic frame and bit rate control (e.g., allowing for slower frame and bit rates when nothing is happening, but switching to faster frame and bit rates for improved video quality during critical events), and satellite IP access into the base station, border regions can be covered.

Mining and Underground Applications

Underground mine safety has emerged as a pressing issue worldwide. Various countries and states have begun using communication technologies to improve mine safety. One primary objective is to maintain and ascertain the health and well-being of mining personnel during normal and emergency conditions. New technologies are applied to address voice communications, however, video surveillance and monitoring can provide additional avenues to increase safety. Furthermore, video surveillance can be used to gather information and improve the efficiency and reduce down time for mining production. However, the inherent nature of mining is not conducive to wired camera deployment. The wireless camera system described herein can be implemented to monitor underground and mining by video surveillance.

Difficult Environments

In many environments (e.g., near or under water or hazardous chemical environments), access to wired power supplies can be difficult if not impossible. One example can be the environment in and around swimming pools. In such environment, wireless camera systems described herein can be implemented to monitor pool safety by video surveillance. Additionally, in a chemical plant or processing plants where caustic or hazardous material conditions may not allow power cabling to exist or where the installation of power cabling may be impractical, the wireless camera system described herein can be implemented to monitor plant safety by video surveillance.

Alarm Verification

Due to the number of false alarms created by security systems, many police departments are reluctant to respond to alarms unless there has been "visual verification" that the situation merits a response. The wireless network camera systems described herein can provides an easy to install (no power needed) camera system to allow for remote visual alarm verification.

FIG. 1A shows an example of a battery powered wireless camera 100 for a wireless network camera system. One energy-saving feature of the battery powered wireless camera 100 is that the web server has been removed from the camera 100 itself. By not having the web server functionality in the wireless camera 100, the camera 100 need not constantly be ready to respond to access from remote clients, which access the web server to initiate data transmission. In one implementation, the wireless network camera 100 can be powered for many months using an internal battery 102. The battery 102 can include, e.g., solar cells, galvanic cells, flow cells, fuel cells, kinetic power generators, or other environmental energy sources.

Battery powered wireless network camera operation can be achieved, for example, at full-motion frame rates in excess of 10 frames per second at a resolution of 320×240 pixels. The wireless camera 100 can be connected through one or more wireless networks with a base station 135. The wireless camera 100 can include multiple radios. For example, wireless camera 100 can include a high-bandwidth radio frequency (RF) transceiver 104 and a low-bandwidth RF transceiver 106 for communicating with the base station 135 via one or more wireless channels. The wireless camera 100 can include a central processing unit (CPU) 110 for controlling various functionalities associated with the camera.

In certain implementations, the CPU 110 can be replaced by a simplified micro-coded engine or state machine, or a hard-coded state machine. For example, the micro-coded engine or state machine can be similar to that of an RF ID tag with limited response to input. This is because the wireless camera 100 can perform a limited number of predefined functions and those functions can be programmed into the micro-coded engine or hard-coded state machine. In this manner, the power requirement and the cost of the camera can be reduced. In an alternative implementation, various components of the CPU 110 can be combined into a single ASIC, which integrates the entire active and some passive components and memory in order to achieve power savings. Flash memory or other memory components can be the only exceptions to this integration.

The CPU 110 includes a general purpose microcontroller 112 running a light real time operating system. Alternatively, in order to reduce overhead the microcontroller 112 may not use an operation system. The microcontroller 112 can execute programs from an external memory such as a flash memory 114 external to the microcontroller 112 or from memory internal to the microcontroller 112. The CPU 110 also includes an image/video compression engine 116, which can perform proprietary compression algorithms or a standard algorithms such as MPEG2, MPEG4, MJPEG, JPEG, and JPEG2000, and the like. Memory contained in the CPU 110 (e.g., flash memory 114 or other memory devices) can store both compressed and uncompressed video.

In one implementation, the compression algorithm can generate data that relates to the relative visual importance of the compressed data bits. This data can be utilized by the forward error correction (FEC) section of the wireless radio (e.g. the high-bandwidth radio 104). The FEC section of the wireless radio can provide "un-equal protection" (UEP) to the transmission of the compressed data as dictated by its importance. The complementary decoder can be implemented in the base station 135. This transmission scheme can achieve increased efficiency for the transmission of the image data. One example of such transmission scheme is a publication by Yanjun Hu, et al. entitled "An Efficient Joint Dynamic Detection Technique for Wireless Transmission of JPEG2000 Encoded Images."

The CPU 110 also includes an audio compression engine 118. Memory contained in the CPU 110 can store both compressed and uncompressed video, as well as compressed and uncompressed audio. Under low battery or poor data radio channel bandwidth conditions, a relatively large amount of energy can be saved by disabling the bulk high-bandwidth radio 104 and not transferring the image, audio or other data to the base station 135. In this mode, the flash memory 114 can be used to hold a significant amount of data—up to many hours until the data is retrieved.

In conditions where the radio transmissions are interrupted or jammed; for example, by an intruder, an alarm can be initiated silently from the base station 135 to the external network or can be externally indicated by visual or audible transducers activated on the base station 135 or wireless camera 100. In one implementation, alarms can be triggered if data transmissions fail for a specified amount of time. This failure in data transmission can be caused by an intentional jamming by an intruder or by a failure to establish a transmission link. In such situation, the wireless camera 100 can store images and/or audio data in a storage element, such as a flash memory 114, for transmission or retrieval at a later time.

Data retrieval at a later time can be achieved by manually removing the camera 100 or storage element from the camera 100 and connecting to a Windows, Linux or Macintosh based computer via a Universal Serial Bus (USB). The storage unit can appear to the computer to be a standard mass storage device with files of the captured data. In another implementation, when there is a failure in data transmission, the system can use an alternative wireless connection to transfer data, for example, such as operating on a different frequency, using different modulation methods, or by increasing the output power of the wireless transmitter.

The compression engines 116 and 118 can operate on captured data output from the sensors connected to the CPU 110. Alternatively, the compression engines 116 and 118 can operate on captured data temporarily stored inside the flash memory 114. In this manner, the compression and capture processes can operate on independent cycles. This independence can also help maximize energy efficiency. For example, the image capture may be occurring 5 times a second, but the compression engine may operate at very high speed on multiple images every 3 seconds. In this fashion, the energy requirements of starting up the compression engines 116 and 118 can be amortized over a large amount of data. In one example, the flash memory 114 can hold approximately 15 uncompressed images before the compression engine is activated.

In some implementations, most or all components of the compression engines 116 and 118 can be integrated into the microcontroller 112 and peripheral blocks. In this way, the compression can be achieved in the microcontroller 112 using a hybrid software and hardware acceleration for computational intensive processing. Other alternatives for the compression engines 116 and 118 can include a separate application specific integrated circuit (ASIC) or a field programmable gate array (FPGA). An example FPGA can be one based on flash technology such as Actel Corporation's Fusion product line, where the "instant on" allows for rapid start-up capabilities reducing energy wastage during the cycling process. Alternatively, the image capturing module 120 can have an integrated compression engine and output compressed data directly to the CPU 110.

The CPU 110 can also perform the burst transmission store/control MAC process needed to transfer the data transmission from the bulk high-bandwidth radio 104. The high-bandwidth radio 104 can be power cycled based on the physical layer characteristics of the radio and sustained bandwidth needed to maintain certain fidelity of the images and audio transmitted. The power cycling of the high-bandwidth radio 104 is further described in more detail below.

In general operation, the microcontroller 112 can be started from a deep power save mode by the clock 111, which can be, e.g., an ultra low power real time clock. The timing of this can vary depending on the aggregate needs of the multiple processes as they cycle. Therefore, once powered up the software can be used to initiate or manage one or more processes including image capture, data transmission, and image compression. In some instances, the clock 111 can be replaced by a microcontroller with integrated low power real time clock capability. An example of such a microcontroller is the Texas Instruments MSP430 family of products.

In one implementation, most or all of the timing required for the wireless camera 100 can originate from the base station 135 and be communicated to the wireless camera 100 through a secondary receiver (e.g., the low-bandwidth radio 106), as will be described in more detail below. This configuration can act as an alternative to using the clock 111 described above, and allow for more of the processing complexity to reside in the base station 135. Additionally, the wireless camera 100 can be simplified, cheaper, and more robust. Furthermore, the wireless camera 100 can consume less power because very little timing processing would be needed in the wireless camera 100. In this way, the wireless camera 100 can act as a "slave" unit and the commands for the processing elements described below can be issued directly from the base station 135.

In general, all the processing can operate on cycles independent of each other to maintain maximum efficiency. Memory can be used to buffer data between processes to allow for this. This buffering memory can be used to ensure that data overrun or data under-run does not occur during operation. This buffering memory can be designed to operate at an extremely low power during non active or retention modes that can occur between processing cycles. This buffering memory can be distributed between some or all of various integrated circuits that constitute the wireless camera 100. Alternatively, a portion of the buffering can be concentrated in specialized memory components. An example of this kind of memory component can be the Cypress Semiconductor Corporation's 16 Mbit SRAM memory product CY62167EV18.

As shown in FIG. 1A, a number of modules can interface to the CPU 110. The image capturing module 120 can include a low power imager such as a CMOS based sensor. Alternatively, a CCD can be used, but typically these devices use more energy than CMOS devices for a given frame rate, resolution and fidelity. The circuitry supporting the sensor can include memory to temporarily hold uncompressed images. In one implementation, image capturing module 120 can also include an image compression engine and memory that stores both compressed and uncompressed images. In some CMOS imagers, so called "active pixel" technology can be used to allow the imager to power up and respond very rapidly to an image exposure command and then automatically power down.

In some implementations, the imager can have a number of active circuits per pixel (such as analog to digital converters) to enable for rapid operation for brief periods of time, followed by very low power standby energy consumption. This also means that the instantaneous power consumption of the imager can be relatively large during the frame capture and transfer process. In an alternative energy saving implementation, the compression circuitry including the required memory can be integrated directly onto the image capturing module 120 or even directly onto the image sensor die. This further integration can reduce the energy needed to transfer data and control information between integrated circuits.

The sound detection module 122 can generate compressed or uncompressed audio data. If uncompressed data is generated from module 122 then the CPU 110 can perform the compression. The sound detection module 122 can also operate at low power, e.g., in the order of tens of micro watts and provide a trigger output based on the noise level. The noise-level triggering event can be detection of a shock wave, detection of breaking or shattering glass detection or other similar acoustic detection techniques. In some implementations, the sound detection module 122 can operate continuously and a positive noise trigger output can be used to activate the wireless camera 100 from a standby mode. Once activated, the wireless camera 100 can initiate the various processing sections to start cycling and, for example, start sending the surveillance data to the base station 135.

In another noise-level triggering mode the sound detection module 122 and the image capturing module 120 can continuously capture and store an on-going window of surveillance data of the immediately previous seconds, minutes or hours. During this time the bulk high-bandwidth radio 104 can be inactive in order to save power. However, once motion is detected some or all of the previously stored information can be transmitted to the base station or retrieved in other ways. This allows the activities that occurred in the area under surveillance prior to a trigger event to be investigated.

In a derivative behavior in this mode, different video compression algorithms operating at different rates can be used before and after the triggering event. For example, JPEG, MJPEG or JPEG2000 type compression algorithms can be used during the pre-trigger period and MPEG2 or MPEG4 type compression algorithms can be used during the post trigger period. This can avoid losing critical captured information on the activities in the surveillance area in a time period leading up to the triggering event.

The infrared detection module 124 can operate at low power, in the order of tens of micro watts, and provide a trigger output that indicates motion has been detected. For example, the infrared detection module 124 can be implemented with a pyroelectric infrared sensor with a Fresnel lens. In some implementations, the infrared detection module 124 can operate continuously and a positive noise trigger output will activate the wireless camera 100 from a standby mode. Once activated, the wireless camera 100 can initiate the various processing sections to start cycling and, for example, start sending the surveillance data to the base station 135.

The ultrasonic detection module 126 can operate at low power, in the order of tens of micro watts, and provide a trigger output that indicates motion has been detected. For example, the ultrasonic detection module 126 can be implemented with a ultrasonic transmitter that sets up a specific sound wave pattern that is received by an ultrasonic receiver. Motion of objects in the field of the sound pattern can affect the received ultrasonic pattern by the receiver. These changes can be detected by the ultrasonic receiver circuitry in the ultrasonic receiver and this event can be used to activate the wireless camera 100 from a standby mode. Once activated, the wireless camera 100 can initiate the various processing sections to start cycling and, for example, start sending the surveillance data to the base station 135.

In another noise-level triggering mode the infrared detection module 124 and/or the ultrasonic detection module 126 and the compression and/or capture processing engine can continuously capture and store an on-going window of surveillance data of the immediately previous seconds, minutes or hours. During this time the bulk high-bandwidth radio 104 can be inactive in order to save power. However, once motion is detected some or all of the previously stored information can be transmitted to the base station or retrieved in other ways. This allows the activities that occurred in the area under surveillance prior to a trigger event to be investigated. In addition, other detection methods can be implemented in a manner similar to that described above for the infrared or ultrasonic detection, but the triggering events can be initiated by other sensors including magnetic sensors, relay or micro switches and window screen wired detectors.

The bulk high-bandwidth radio 104 can be a radio frequency and baseband chipset that implements the physical layer of the 802.11 standard. A key purpose of this radio transceiver is to transfer the bulk of the captured and compressed surveillance data to the base station 135. The MAC and other circuitry may or may not comply with 802.11 standards. The chipset transceiver activities can be power cycled based on methods which will be discussed in further detail below.

Implementations of the techniques described here can be used to achieve efficient use of the high-bandwidth radio 104 in terms of energy per bit per unit of range (distance between transmitter and receiver) transferred. When active the radio can draw or dissipate relatively large amounts of power, however, due to the power cycling techniques, the power consumption of the wireless camera 100 can still be substantially low. In particular, modulation techniques that use broad frequency channels in the order of 5 MHz can be used. This is because these techniques exhibit low energy per bit (of data) per distance of transmission. In one implementation, a multi-carrier modulation technique such as orthogonal frequency division modulation (OFDM) can be used. In another implementation, a spread spectrum modulation scheme such as code division, multiple access (CDMA) can be used.

The low-bandwidth radio 106 can be, e.g., a low-overhead, long-range radio transceiver. The low-bandwidth radio 106 can be a radio frequency and baseband chipset that implements any low power, low-bandwidth technique that will likely have longer reach and higher reliability than the bulk high-bandwidth radio 104. One purpose of the low-bandwidth radio 106 is to transfer status, control and alarm information to and from the base station 135. In receive mode, the power consumption can be extremely low in comparison to the bulk radio 104 and can be low enough to allow the low-bandwidth radio 106 to operate continuously. For example, the power consumption can be in of the order of tens of micro watts.

Using this approach, the low-bandwidth radio 106 has a low power mode where the radio 106 can be activated to respond to a short duration, beacon transmission that originates from the base station 135. The bit stream information contained in the beacon transmission can identify the correct camera and can also have other command/status information. In another implementation, the low-bandwidth radio 106 can be used as a backup when the bulk radio 104 fails or is disable, e.g., due to jamming signals. In this manner, reliability of the wireless camera 100 can be increased because there are a primary high-bandwidth radio 104 and secondary low-bandwidth radio 106 for redundancy. In certain implementations, the high-bandwidth radio 104 and the low-bandwidth radio 106 can be in the same transceiver block.

Additionally, errors in the bit stream of the beacon during transmission can be corrected by using forward error correction (FEC) techniques, such as hamming codes. Details of the forward error correction and its associated timing and phasing techniques will be described below. The bit stream can serve as a "wake-up" function, allowing the base station 135 to activate the correct wireless camera to wake-up and perform certain tasks during times when many components of the wireless camera may be in the shut down mode. In one implementation, this low-bandwidth radio 106 can be achieved using "multi-standard" radio design, which may share portions or components used in the bulk radio 104. The sharing of "multi-standard" components can lead to lower cost or power from an overall system perspective.

As noted above, the wireless camera 100 includes an internal battery 102, which can be a standard non-rechargeable battery or a battery pack. In one implementation, a combination of rechargeable and non-rechargeable batteries can be used. In another implementation, the rechargeable battery can be replaced or augmented by so called super capacitors. Such capacitors are readily available, e.g., from companies like Maxwell Technologies Inc. The sources for the recharging energy can include, e.g., solar cells, fuel cells, galvanic cells, flow cells, kinetic power generators, and environmental energy sources. These energy sources will be describe in more detail below.

The wireless camera 100 can make use of extensive active, high efficiency, power regulation and booster circuitry to optimize the use of the energy available from various sources. Some or all of electronic processing and memory elements can be integrated into a single ASIC to reduce cost and power, creating a single chip wireless camera. In addition to the components shown in FIG. 1A, a Pan, Tilt and Zoom mechanism and control can also be included for user control of the wireless camera 100. Optionally, wireless camera 100 includes LED 108.

Figure 1B:
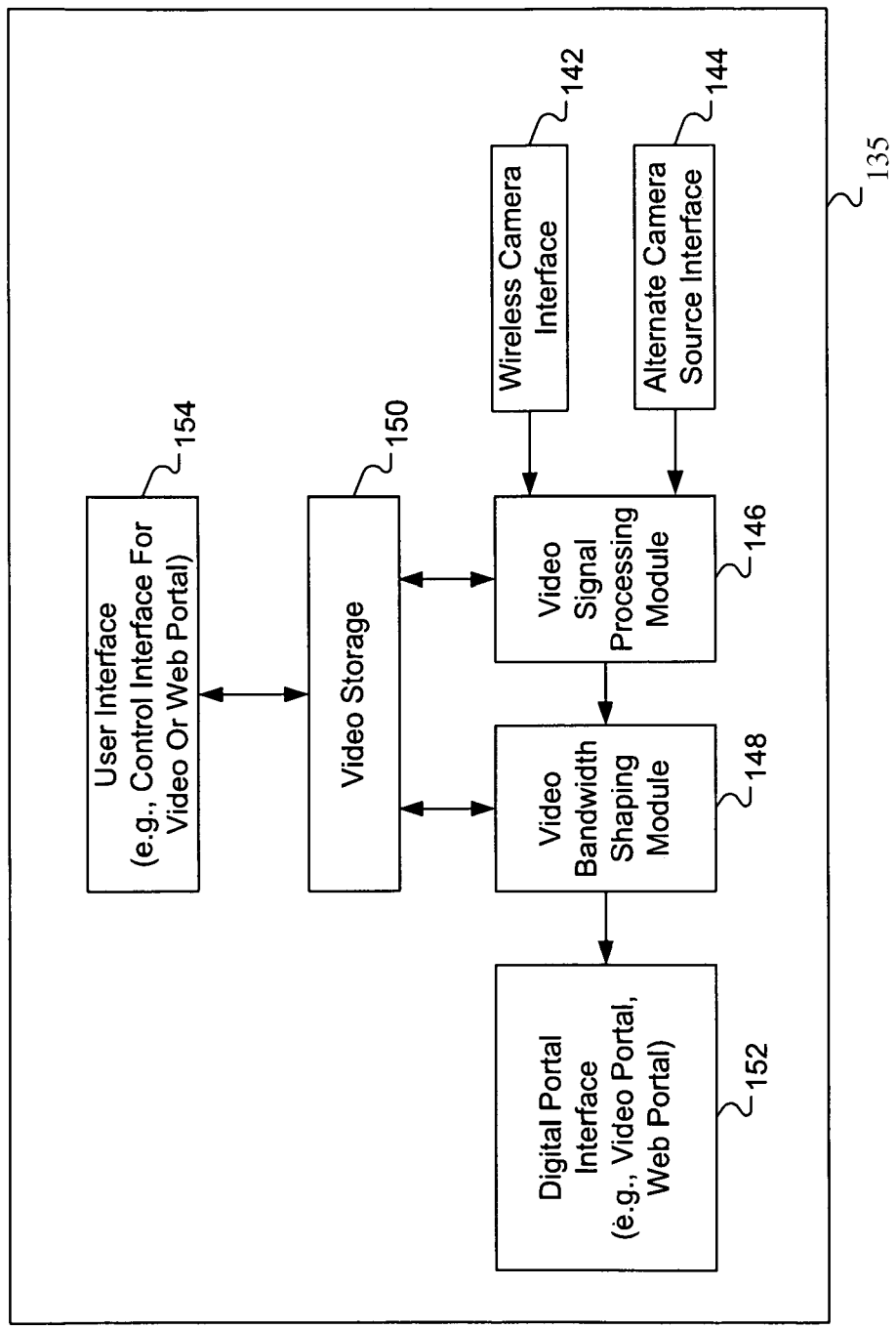
FIG. 1B shows an example of a base station with a digital portal interface.

FIG. 1B shows an example of a base station with a digital portal interface. A base station 135 can include a wireless camera interface 142, and a video signal processing module 146, and a video bandwidth shaping module 148, and a digital portal interface 152. Video storage 150 can include a hard disk drive or a memory such as flash. In some implementations, video storage 150 can include additional storage provided by a removable flash storage module. In some implementations, a digital portal interface 152 can include a network adapter such as Ethernet or a wireless interface such as WiFi, WiMax, or cellular interfaces and a processing unit configure to communicate with a digital portal such as a web portal or video portal and to receive digital information such as video, images, or audio from the video bandwidth shaping module 148. In some implementations, a base station 135 can include one or more processing units to perform the operations of a video signal processing module 146, video bandwidth shaping module 148, and to communicate with a web portal or video portal device; and digital portal interface 152 can include a wired or wireless network interface to communicate with the video or web portal. Some implementations can include an alternate camera source interface 144 to communicate with different types of wireless cameras and/or wire-line cameras such as cameras with Ethernet or USB interfaces. A base station 135 can include a user interface 154 to provide an interface for base station 135 and/or a control interface to communicate with the video or web portal via digital portal interface 152.

Figure 1C:
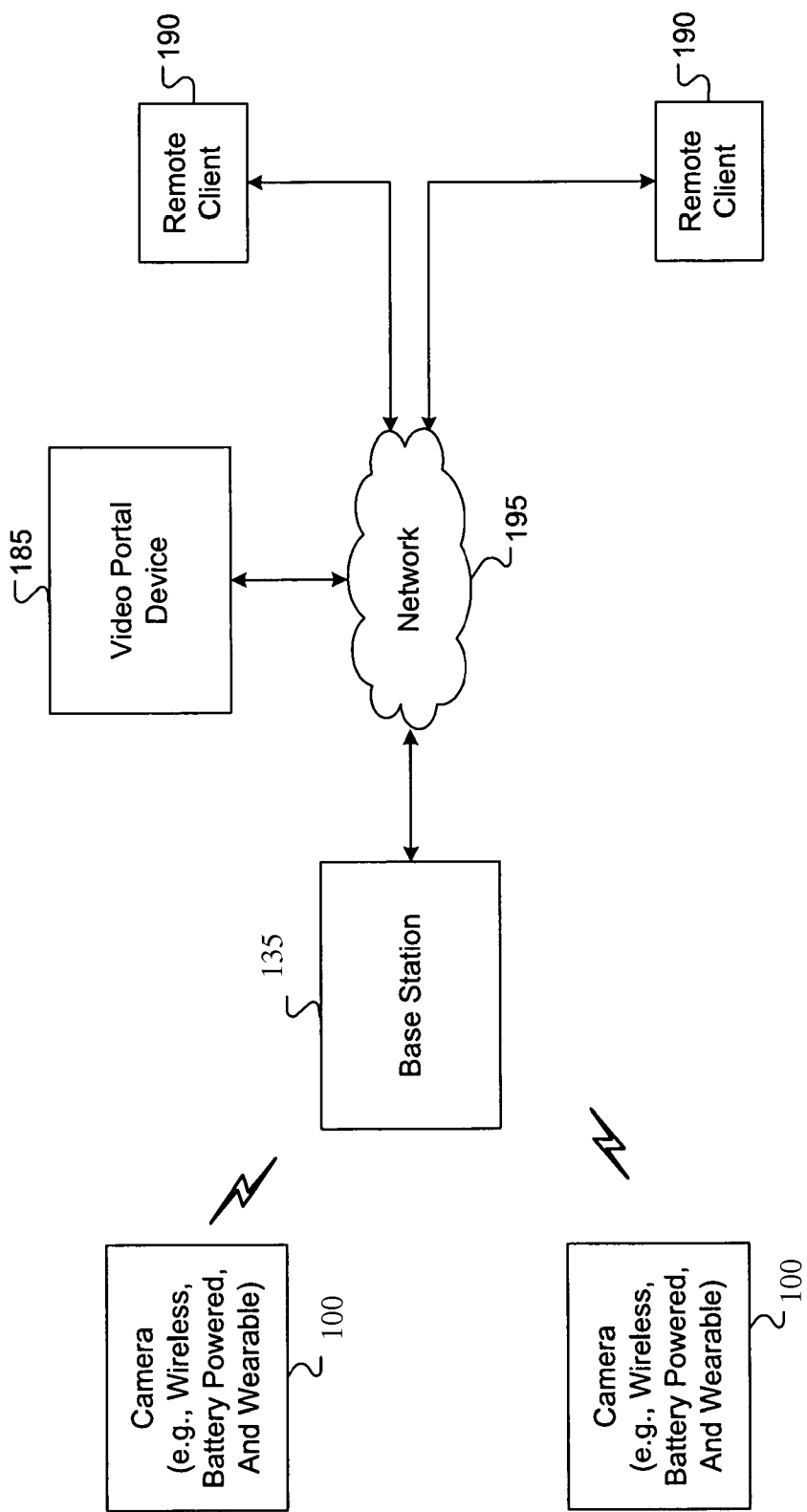
FIG. 1C shows an example of a video delivery system.

FIG. 1C shows an example of a video delivery system. A video delivery system can include one or more wireless cameras 100, a base station 135, and a video portal device 185. A wireless camera can transmit a video feed to base station 135 and the base station 135 can process the video feed before sending the feed to the video portal device 185. In some implementations, a wireless camera 100 is arranged in a wearable form factor so that the wireless camera can be worn on a person, and can include a battery.

In some implementations, a network 195 can connect the base station 135, video portal device 185, and one or more remote clients 190. Network 195 can include multiple networks and/or different types of networks. For example, network 195 can include a wireless network and the Internet. In some implementations, base station 135 can communicate with a video portal device 185 via a wired or wireless network such as 3G/4G cellular, wired Ethernet, a WiFi network, or a WiMAX network. In some implementations, a video portal device 185 can include one or more processing units to perform operations described herein. A video portal device 185 can host a web server to deliver digital information such as videos, images, or audio to one or more remote clients 190 via a network such as the Internet. In some implementations, a video portal device 185 can include a remote surveillance application to control one or more wireless cameras 100, and can include support for multiple browser clients such as desktop PC, cell phones, and smart phones browser clients.

A wireless camera 100 can transmit digital information, such as images or video, to a video portal device 185 via the base station 135. Remote clients 190 such as a mobile device, cell phone, smart phone, computer can view or access the digital information by communicating with the video portal device 185. In some implementations, a remote client can run a web browser to access a web server hosted on a video portal device 185.

A digital portal interface 152 can receive instructions from a network device such as a web portal or a video portal device 185. Examples of instructions include how to configure, compress, and select video camera images for transmission to a remote client 190. In some implementations, a remote client 190 or video portal device 185 can initiate and transmit one or more instructions. In some implementations, a camera 100 can initiate and transmit one or more instructions to control a video feed. A video bandwidth shaping module 184 can receive instructions from a digital portal interface 152 or a user interface 154. Instructions may come from a remote client 190 via a video portal device 185.

A video bandwidth shaping module 148 can produce a data feed to send or stream to a video portal device 185 based on characteristics, e.g., source, how, when, time, of one or more video feeds received or streamed via an interface such as a wireless camera interface 142 or an alternate camera source interface 144. In some implementations, a video bandwidth shaping module 148 can compress a video feed. Video signal processing module 146 can perform one or more operations such as compression, object recognition, image stability processing such as anti-shake, motion detection, and fire detection. A base station 135 or a video portal device 185 can originate notifications such as emails, text messages or other alerts based on events such as detected motion or fire. In some implementations, video storage 150 can store high quality video and base station 135 can transmit preview quality selections of the high quality video to a video portal device 185.

A base station 135 can support multiple wireless cameras, can support one or video surveillance applications, e.g., Axis communications API, can capture images from a wireless camera's video or image feed based on a timer or when motion is detection at the camera, can emulate a USB webcam interface, can include a LCD viewing device, and can include a battery. A base station 135 can connect to a selected wired IP camera via an interface such as alternate camera source interface 144. A base station 135 can connect to devices such as a cell phone via connections through a USB modem or network interface. A base station 135 can include a broadband wireless card for wireless communications with the video portal device 185 and/or the Internet.

Figure 1D:
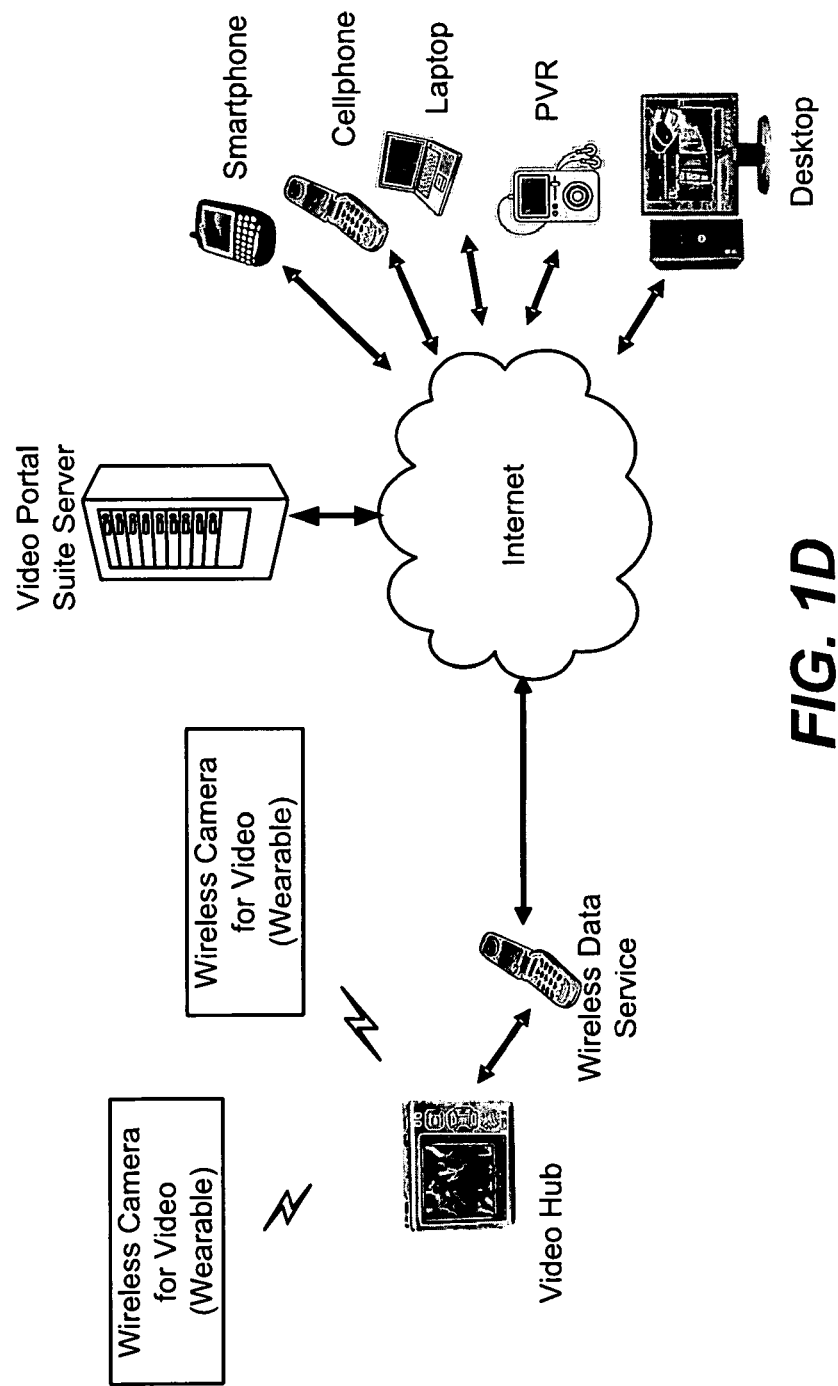
FIG. 1D shows a different example of a video delivery system

FIG. 1D shows a different example of a video delivery system. A wireless device can provide communication between a video hub/base station and the Internet. The video hub can receive video from wireless cameras for video that are wearable. In some implementations, a wearable wireless camera can weigh less than 100 grams. A video portal suite server can act as a delivery channel between the video hub and devices such as a smart phone, cell phone, laptop, personal video player/recorder (PVR), or a desktop.

Figure 1E:
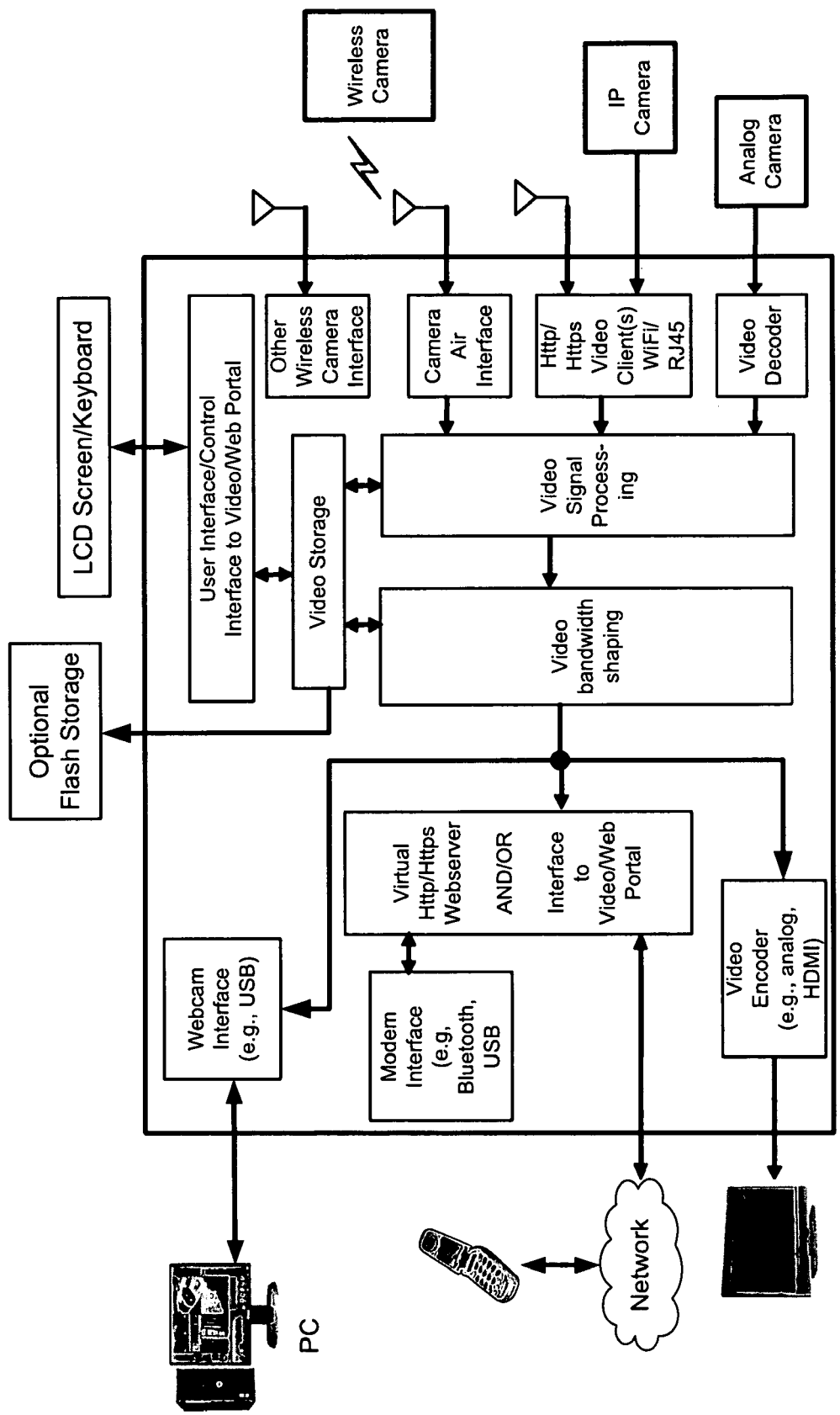
FIG. 1E shows an example of a video base station and system.

FIG. 1E shows an example of a video base station and system. A base stationed configured for video can also be referred to as a video base station or video hub. Such a base station can use an interface similar to wireless camera interface 142 to communicate with wireless cameras.

Figure 2A:
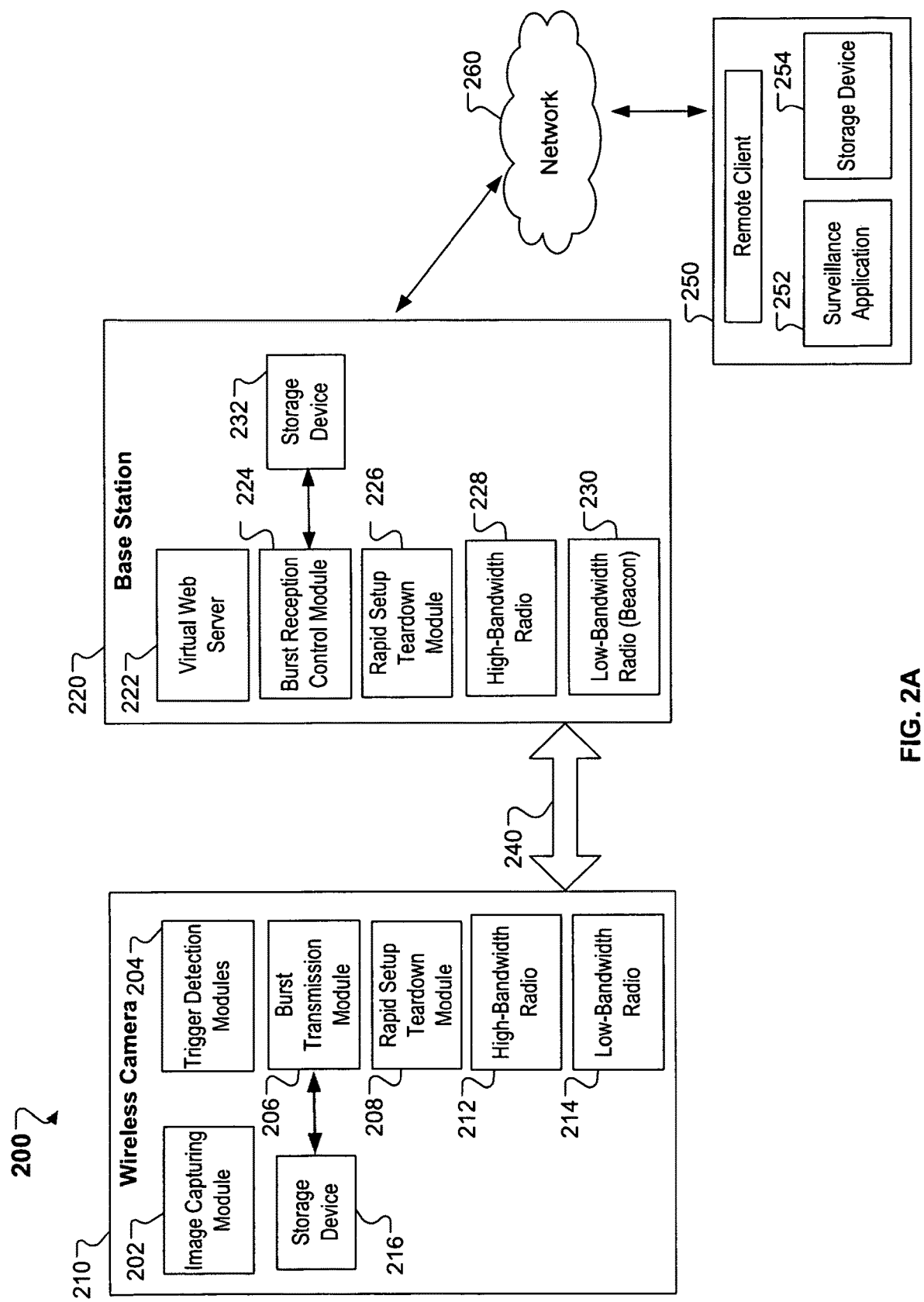
FIGS. 2A,2B show different examples of a battery powered wireless network camera system for remote surveillance applications.

FIG. 2A shows an example of a battery powered wireless network camera system 200 for video surveillance applications. In this example, the wireless network camera system 200 includes a wireless camera 210, a base station 220, a wireless link 240 connecting the wireless camera 210 and the base station 220, and a remote client 250. The system 200 can further include a network 260 connecting the base station 220 and the remote client 250. The network 260 can be a LAN or wide area network (WAN), a wireless network (e.g., WiFi, WiMax, or cellular networks), or power over Ethernet network (e.g., based on the IEEE 802.a3f standard). In some implementations, this network connection can be replaced by a universal serial bus (USB) interconnect directly connected to a computing device. From the client 250 or network 260 perspective, the wireless network camera system 200 can support extensive protocols including IP, HTTP, HTTPS, 802.1x, TCP, ICMP, UDP, SMTP, FTP, DHCP, UPnP™, Bonjour, ARP, DNS, DynDNS, and NTP. The base station code can comply with well established IP camera API's from companies such as Axis communication's "VAPIX" API or similar API's.

Figure 2B:
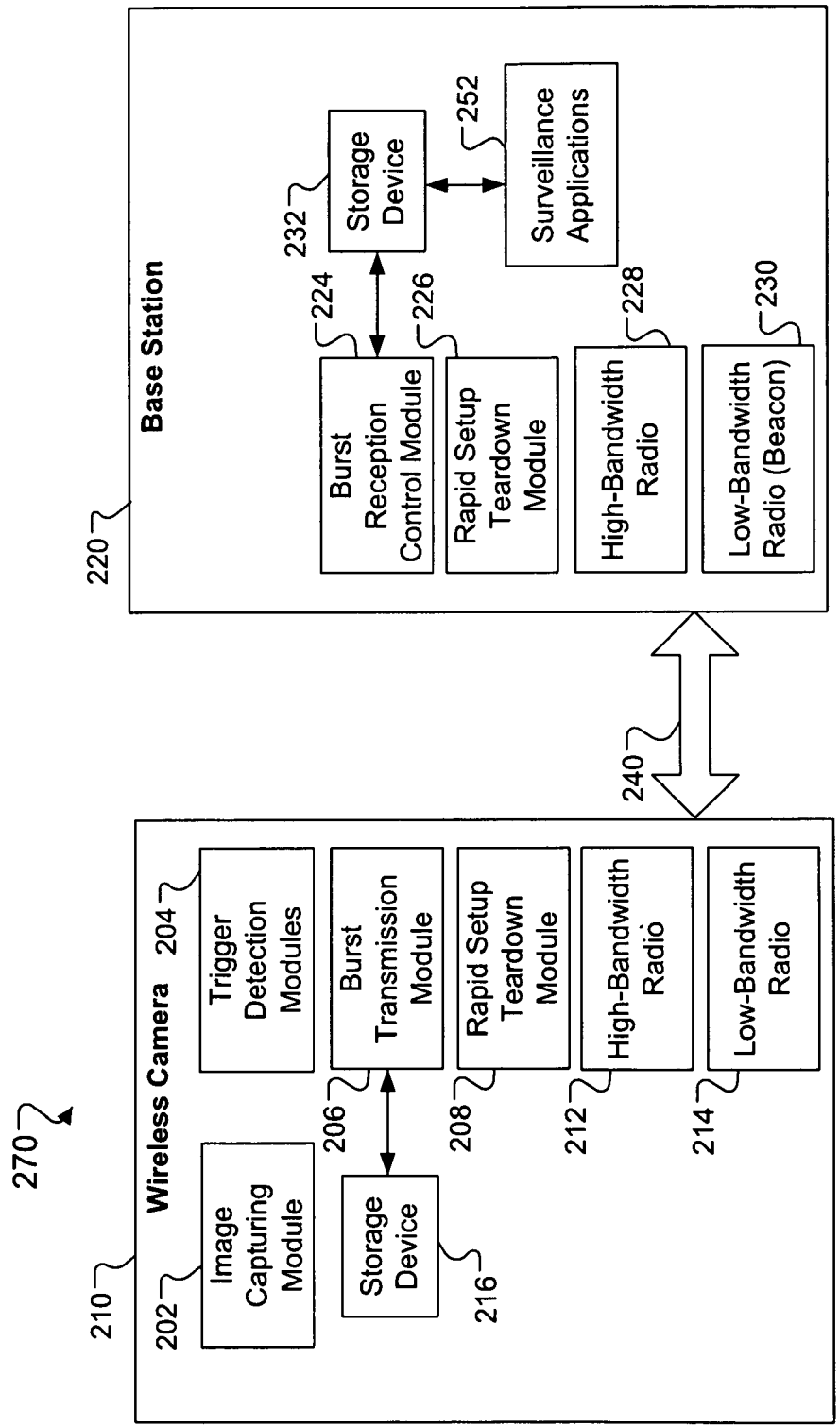

A suitable wireless camera in FIG. 2A can be implemented in various configurations, including the wireless camera 100 described in FIG. 1A. In one embodiment, wireless camera 210 includes image capturing module 202, trigger detection modules 204, burst transmission module 206, rapid setup teardown module 208, high-bandwidth radio 212, low-bandwidth radio 214 and storage device 216. The base station 220 can receive information (e.g., video and audio information) from the wireless camera 210 through the wireless link 240 and process the received information. The base station 220 can also be one or more computers performing similar functions as a wireless base station 220 and running a surveillance application. Hence, the computers can function as the base station 220 and the client 250. For example, FIG. 2B shows another battery powered wireless network camera system 270 for remote surveillance applications, where the surveillance client runs on the same system as the base station 220, and the virtual web server in the base station 220 can be eliminated. Wireless camera 210 optionally includes image capturing module 202, trigger detection modules 204, burst transmission module 206, rapid setup teardown module 208, high-bandwidth radio 212, low-bandwidth radio 214 and storage device 216. Base station 220 optionally includes burst reception control module 224, rapid setup teardown module 226, high-bandwidth radio 228, low-bandwidth radio 230, storage device 232 and surveillance applications 252.

Referring back to FIG. 2A, in one embodiment, base station 220 optionally includes virtual web server 222, burst reception control module 224, rapid setup teardown module 226, high-bandwidth radio 228, low-bandwidth radio 230 and storage device 232. The base station 220 includes a virtual web server 222 for relaying processed information to a remote client. The web server 222 can act as a virtual/proxy web camera server. Further, the web server 222 can shield the remote client 250 (running a surveillance application) from the burst transmission mechanism (which will be discussed in further detail below) of the wireless camera 210. In addition, the web server 222 can act as a virtual web server or relay server for a number of wireless cameras, aggregating the video streams but appearing to the surveillance remote client 250 as multiple separate virtual IP cameras. The web server 222 can therefore relay the camera data to the surveillance client 250 using standard network means such as IP, HTTP, HTTPS, TCP, ICMP, UDP, SMTP, FTP, DHCP, UPnP™, Bonjour, ARP, DNS, DynDNS, 802.1X, and NTP.

As described above, by removing the web server for a network camera system out of the wireless camera 210, the wireless camera can achieve ultra-low power consumption. However, unlike the wireless camera 210, the base station 220 requires a relatively robust external power supply to allow for continuous operation of the web server 222. This power supply can have a battery back-up to enable operation for periods of hours to days during main power loss. It may also be possible to power the base station 220 from a large battery which is charged by a relatively large solar cell panel. In another implementation, the base station 220 can obtain some or all of its power through a power over Ethernet (POE) methods, such as the IEEE 802.3af standard. In this case also the unit may have battery back-up capabilities.

Furthermore, the base station 220 can be a self-contained unit with no keyboard or monitor to enable a small form factor. For example, the base station 220 can have a form factor similar to that of a "wall wart," which is a small power-supply brick with integral male plug, designed to plug directly into a wall outlet. Additionally, the wall-wart style base station 220 can use the Power over Ethernet methods for communications with the client device. In this manner, the base station 220 can be easy to install because it can be readily plugged in to a power socket. The base station 220 can also use flash memory or rotation media to store captured data.

As noted above, audio/video data can be requested by the client application system through the network 260 and serviced by a virtual web server 222 in the base station 220. Typically, the remote client 250 consists of computer running a software application that analyzes and/or stores data for security and surveillance purposes. Multiple cameras can be connected to a base station 220 via the wireless link 240. The client computer can in turn run a surveillance application to access the connected cameras. The client application can query the virtual web server 222 in the base station 220 using standard or de-facto APIs such as those available from Axis communications. The base station code can comply with well established IP camera API's from companies such as Axis communication's "VAPIX" API or similar APIs. Remote client 250 optionally includes surveillance application 252 and storage device 254.

In one implementation, the base station 220 can be connected to the Internet through a cable modem or a DSL modem. In this manner, the IP address of the cable modem or DSL modem can be dynamically assigned. The constant changing of the IP address can make it more complicated to build a virtual web server on the base station 220 and provide accessibility to clients on the Internet. A dynamic domain name server (DDNS) service can be used to allow users anywhere on the Internet to "find" the base station web server 222, even if its IP address is constantly changing. A DDNS function can be provided to enable a fixed name for the web server so that remote users on the Internet can find the IP address of the web server.

In certain implementations, the base station 220 can include software that determines the dynamically changing IP address and forwards a new IP address to the DDNS. This can occur every time a new IP address is assigned by the local Internet Service Provider (ISP). The software can send the necessary updates to all of the DDNS host names that need it. The user or remote client software can use a specifically constructed "domain name" and this would be setup in the DDNS hosting site. Therefore, if the IP address is changed by the local ISP then the DDNS updates the DNS records and sets the TTL (time to live) to a value that will cause a propagation of the updated DNS record throughout the Internet. There are many common providers that provide hosting services, such as dyndns.org. Alternatively, domain names can be purchased or free ones can be obtained, but many of the free ones can have usage restrictions.

Additionally, the remote client 250 can run on a handheld or wireless device, such as a mobile phone, a personal digital assistance (PDA), a smartphone, or the like. In one implementation, the base station 220 can include image optimization processing software or hardware for relaying the captured images to the remote client via a wireless application protocol (WAP). For example, the base station 220 can perform image formatting, coding and communication in order to optimize the image quality and behavior to the characteristics of the network link and the constrained nature (bandwidth/size) of the handheld device that is running the client viewing software.

This image optimization processing can enable the base station 220 to only send portions of the image at a time or only send zoomed-in image information (to best fit to the smaller screen and lower network bandwidth of the handheld device), or send images with lower resolution or at lower frame rates. For example, this feature can allow an end user to remotely view the output of the wireless cameras from the convenience of a handheld device, such as a mobile phone. Remote viewing of the wireless camera output from a handheld mobile device can be offered as an additional service to the user from the mobile network carrier company (e.g., AT&T). This can create an attractive revenue generation opportunity for the mobile network carriers.

The base station 220 can also include a low-bandwidth, low-power radio beacon 230 for communication with the wireless camera 210 via a second wireless link. The secondary radio 230 can be low power, however, the timing of this secondary radio 230 needs to be accurate in order to use the bulk, high-bandwidth radio transmission efficiently. The predictability of the secondary radio coming on and transmitting information may need to be in the order of less than one millisecond response time in order to avoid wasting the channel time of the high-bandwidth bulk radio.

The wireless link 240 can include one or more wireless links. For example, a first wireless link can be a high-bandwidth wireless link and a second wireless link can be a low-bandwidth wireless link. In addition, the wireless link 240 can be an RF connection, a low complexity LF, UHF or VHF connection with a baud rate of a few to tens of kilobits, a Bluetooth connection, a cellular network, a wireless Ethernet network, a WiFi network, or a WiMAX network. Another implementation for this type of radio can be seen in, e.g., "Low-power, super regenerative receiver targets 433-MHz ISM band", as described in page 78 of the February-2006 issue of Electronic Design News. The network 260 connecting the base station 220 with the remote client 250 can be a wireless network (e.g., a Bluetooth connection, a cellular network, a wireless Ethernet network, a WiFi network, or a WiMAX network) or a wired network (e.g., LAN/WAN network, or POE network).

Several power saving techniques can be used individually or in combination to reduce the overall battery energy consumption in the wireless camera. These techniques are listed and explained in further detail below:

1. Move the camera web server to the base station and re-deploy it as a virtual web server.
2. Cycle the image/sensor bulk, high-bandwidth data transmission radio based on the needs of the data rate and channel capacity.
3. Cycle the image capture module (hardware or software) based on the most efficient use of the module vs. latency, start-up/shut down time and storage capacity needs.
4. Cycle the compression module (hardware or software) based on the most efficient use of the module vs. latency, start-up/shut down time and storage capacity needs.
5. Use of a secondary low-bandwidth radio with a longer range than the bulk radio for camera control and status report and triggering signals.
6. Activation of the camera functions based on various triggering events.
7. Use of environmental energy sources.
8. Use of pulsed high efficiency light emitting diode (LED) devices to illuminate the field of view Energy Saving Technique 1:

Move the camera web server to the base station and re-deploy it as a virtual web server.

One fundamental feature of the wireless camera describe in this specification is that the wireless camera does not directly service requests for data received via a web server or a relay server mechanism. This is because there is no need for a web server to be running in the wireless camera. Instead, data transmission can be initiated and controlled by the burst transmission store/control block of the wireless camera. A substantial power saving can be achieved through this technique because it eliminates the need for web server functionality to be present in the camera and allows the link radio to power down until sensor and image data has to be transferred, not when the client application needs data. (See power saving technique 2 below for further discussion). However, through the use of the web server mechanism the camera data can be available to client applications using standard network means such as IP, HTTP, HTTPS, TCP, ICMP, UDP, SMTP, FTP, DHCP, UPnP™, Bonjour, ARP, DNS, DynDNS, 802.1X, and NTP Energy Saving Technique 2:

Cycle the image/sensor data transmission radio based on the needs of the data rate and channel capacity.

Technique 2 cycles a high-bandwidth radio bursting data on a periodic basis determined by a burst period. Between the burst transmissions the high-bandwidth radio can be powered down. On average, the energy needed to transfer data can be optimized. In one implementation, an 802.11 based physical layer technology can be used to transfer the bulk data. The physical layer technology used can include broadband high efficiency Orthogonal Frequency Division modulation (OFDM) architectures. The OFDM modulation technique can exhibit low energy per bit transferred per unit of range when compared to other commonly used radio link architectures, such as 802.15.4 OOC/FSK modulation techniques. For example, in an OFDM architecture using QAN 16, energy per bit of less than 6 nJ can be achieved at 50 meters indoors at 2.4 GHz (including forward error correction processing needed) using the Okumura-Hata path loss model. In contrast, a similarly configured narrow band radio may achieve around 200 nJ per bit.

Figure 3:
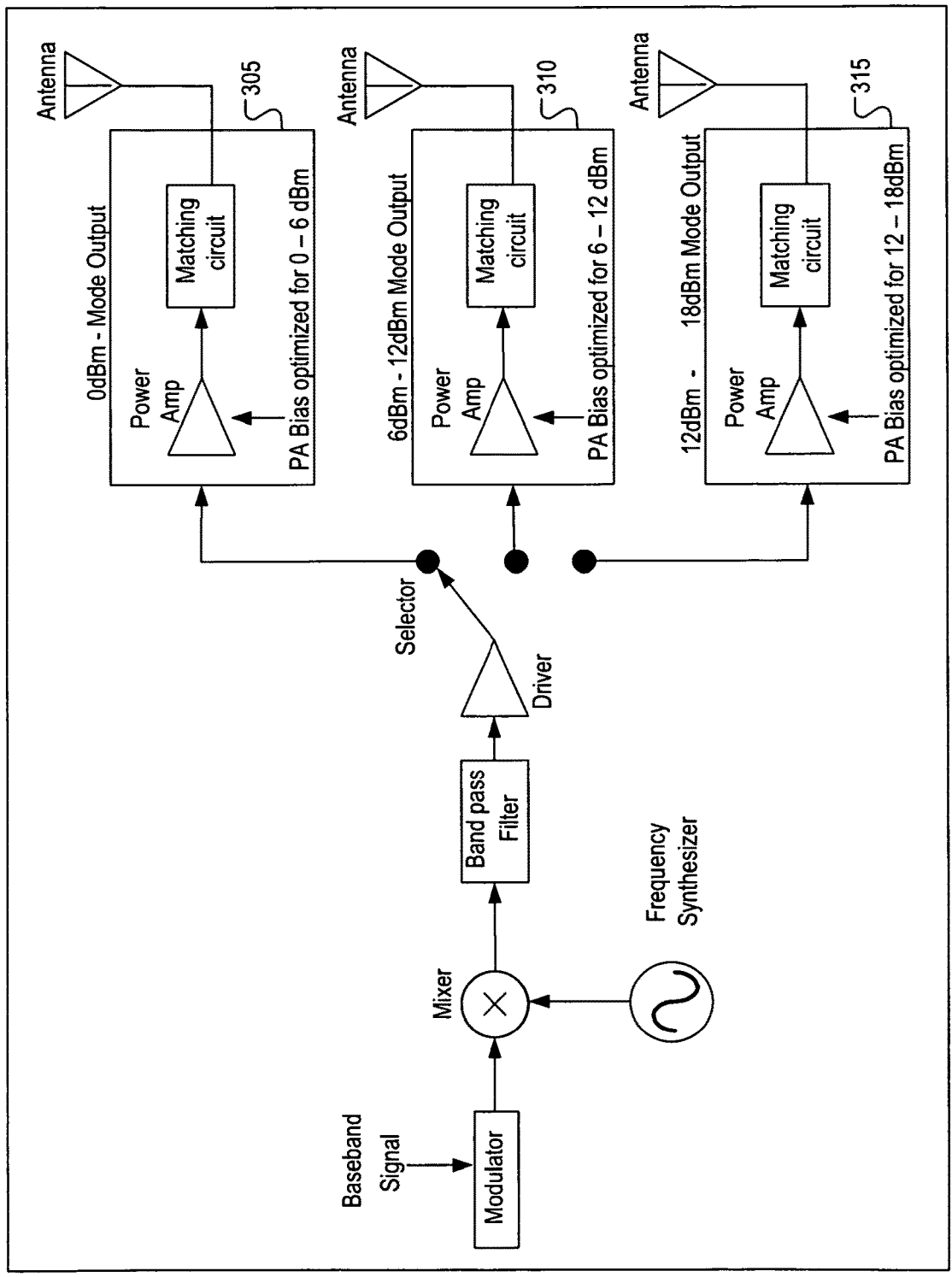
FIG. 3 shows an example of transmission circuitry that includes multiple output circuits.

FIG. 3 shows an example of transmission circuitry in a wireless camera's radio that includes multiple output circuits. The efficiency of a wireless camera's radio can be enhanced by using multiple output circuits 305, 310, 315 that each include a power amplifier (PA) and antenna matching circuitry. The radio can arrange circuits 305, 310, 315 in an array configuration. In some implementations, output circuits 305, 310, 315 are biased differently to optimize their performance for different output power level ranges. For each of the three output circuits 305, 310, 315, respective power amplifier and matching circuit are implemented, biased and configured to provide optimal output power where efficiency is at or near its peak. For example, matching circuitry for a power amplifier can be selected based on a power amplifier's bias level, and as a result, differently biased power amplifiers can couple with different matching circuits for optimal performance. A selector switch for selecting output circuits can be placed before the output circuits 305, 310, 315 to minimize power consumption.

Transmission circuitry can select one of the output circuits 305, 310, 315 based on wireless link conditions. Such selection can provide a desired or minimum transmit output power at the optimal PA and matching circuit efficiencies. In some implementations, a high bandwidth wireless camera transmitter can operate at 802.11g standard OFDM modulation rates including 24, 36, 48 and 54 Mps. The wireless camera radio transmitter can operate using the 802.11n modulation scheme which can achieve 65 Mbps using 52 sub-carriers and a forward error correction coding rate of 5/6. In some implementations, a wireless camera's radio can include a burst transmission unit, and the burst transmission unit includes multiple output circuits such as output circuits 305, 310, and 315.

The wireless camera media access control (MAC) for the high-bandwidth radio can be programmed to set-up/tear down connections as determined by the Transmission Store/Control Block. This allows the high-bandwidth bulk data transmission radio to power down completely for extended periods of time.

When the radio is switched on it can be instantly assumed to be logically linked with the base station. In some implementations, a primitive MAC layer can be used. Thus, the radio can avoid the usual discovery period, and advance to the authentication request and reply, followed by the associated request and reply messages in a three-way handshaking process. This differs from the regular beacon behavior of 802.11 when operating in a rendezvous mode. Discovery sequences can be suppressed except during initialization/installation conditions. A very light OS can run on the wireless camera to bring up the MAC with the minimal configuration. This can reduce the need for the power and time consuming mechanisms associated with current wireless link technologies. In certain implementations, the MAC layer can almost be entirely eliminated from the camera and a rudimentary slave response can be implemented which responds to control signals received from a secondary, low-power, low-bandwidth radio channel.

The algorithm for the burst transmission processing is a timing loop where data is transmitted based on the data rate used and the available channel characteristics. A calculation is done to determine the optimum timing for the burst transmission and the system is then set up to match this as closely as possible. During non-transmission periods the high-bandwidth radio can be completely powered down. This can be different from "doze" or "standby" modes often provided by commercial integrated circuits. These modes often dissipate energy at levels that can defeat the possibility of extremely long term battery life. During this non transmission time the high-bandwidth radio can use less than tens of micro watts of power.

The timing to transmit for the burst transmission is based on the following parameters: Average Maximum Channel Bandwidth is represented by Bm in M bits per second (Mbps). Channel bandwidth is the average bandwidth that can be achieved by the high-bandwidth link. Average sustained Data Rate is represented by Bs in Mbps, which is the data rate of captured audio/video data. The higher the rate, the better the fidelity and frame rate of the transmitted information.

Figure 4:
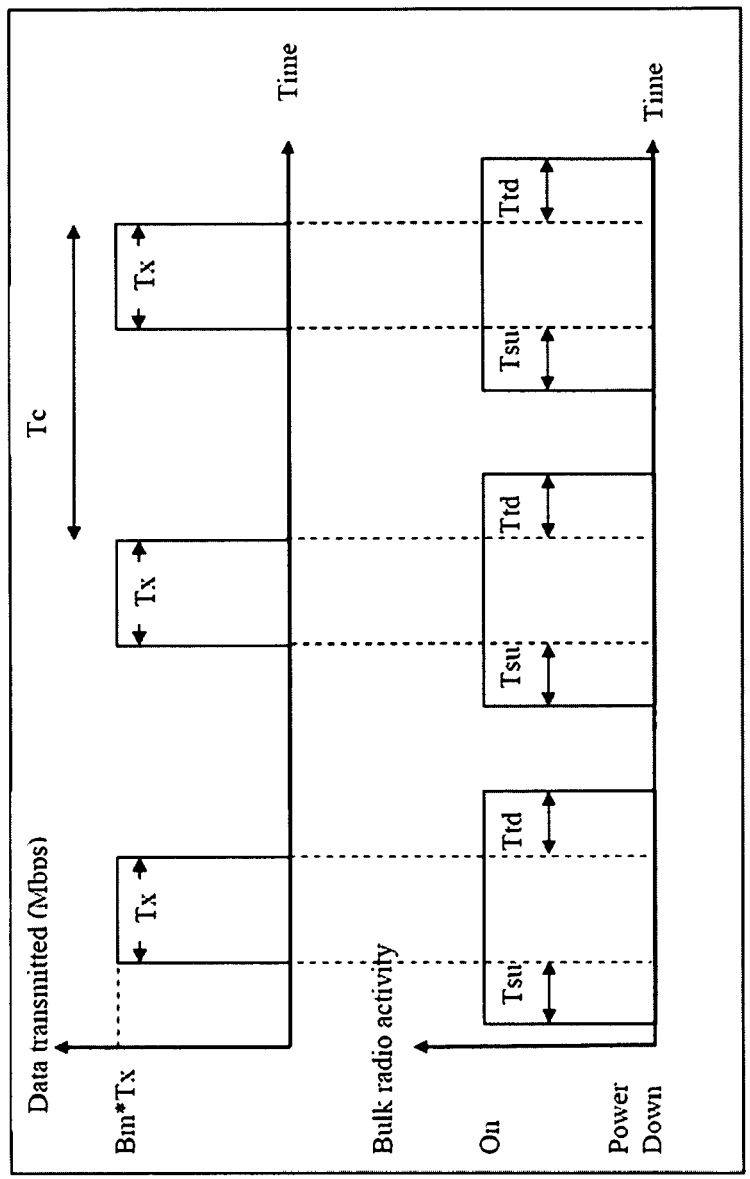
FIG. 4 shows an example of a burst data transmission.

FIG. 4 is a diagram showing the burst data transmission, according to some implementations. To take advantage of the fact that the sustained data rate Bs is much smaller than the capability of the bulk radio; the transmission will be on for a brief period of time to burst the data. This period can be designated by Tx (sec), and the time period between bursts can be $$Tc = \frac{Tx * Bm}{Bs}.$$

represented by Tc (sec), e.g., Referring to the bottom of FIG. 4, there can be a time associated with setting up the link and tearing down the link. For example, the time to set up link is represented by Tsu (sec), and the time to tear down link is represented by Ttd (sec). Therefore the aggregate time to set-up and tear down link Tw=Tsu+Ttd (sec). To obtain maximum power saving efficiency on the bulk, high-bandwidth radio, ideally the ratio of the transmit time Tx to power down time should be equal to the ratio between Bs and Bm.

During the Tx period, the power drawn by the high-bandwidth radio can be very high relative to the power down periods. For example, the wireless camera that uses a 802.11n transmitter with diversity or multiple transmitter sections (including the more complex and power intensive processing required for OFDM) can use between 100 mW to 1.5 W during the Tx period instead of a few hundred microwatts in other periods. This level of power consumption during the transmission of data can be a distinguishing feature of this system compared to existing "low power" remote sensor systems which use narrow band radio transmission and simpler modulation schemes. Existing low power remote sensor systems may require less power to operate when actively transmitting, but may have the disadvantage of lower transmission bandwidth and data throughput.

Also, in image transmission operation, current battery operated camera systems which transmit data intermittently have a transmitter-off to transmitter-on ratio of 10 or less. That is to say, the transmitter in the existing wireless systems is on most of the time. In contrast, because of the high-bandwidth radio used for transmission, the high-bandwidth transmitter is on for a short period of time. In this manner, the burst transmission of the current system has a transmitter-off to transmitter-on ratio of much greater than 10.

However, the system timing needs to take into account the "wasted" time necessary to setup and tear down the link during which the radio is active, which is Tw. In order to approach the ideal efficiency, period Tw needs to be amortized across a relatively long period of active data transmission time (Tx). This means that the time in-between bursting the radio, as represented by Tc, can be extended as Tw increases to maintain the same efficiency level. Hence the efficiency (E, in percentage) can be given by $$E = \frac{Tx}{(Tx + Tw)} \cdot 100\%$$

Given the above, the average optimum time between transmission of the burst of audio/video (Tc) data for a given efficiency E, can be determined as follows:

$$Tc = \frac{Bm}{Bs} \cdot Tw \cdot \frac{E}{E(1-E)}$$

Example parameters for this equation include setting Tw=3 ms (Optimized system), Bm=54 M bits/sec (ideal 802.11g data rate), Bs=192 k bits/sec (5 frames/sec with 0.5 bits/pixel at 320×240, no audio), and E=75%. Using the example parameters, Tc=2.53 seconds. By manipulating the MAC layer as described herein, it is possible to reduce Tw to be less then 5 milliseconds for a system co-existing with a normal 802.11 environment.

System latency (or lag) can be greater than or equal to Tc. If latency is too high an unacceptable lag can occur between the capturing of audio/video information to its availability to serve a surveillance application. To reduce latency without negatively impacting energy consumption, significant optimizations need be made to the MAC behavior in order to reduce Tw. In order to reduce time period Tw during steady state conditions (i.e. not during discovery or initialization states) certain modifications can be made. For example, a modification to the regular beacon behavior of 802.11 can be made. When the high-bandwidth radio is switched on for transmission, it can be assumed to be synchronized with the base station. Thus, the usual discovery period can be avoided and the high-bandwidth radio can advance immediately to the authentication request and reply, followed by the associated request and reply messages. Further, when the high-bandwidth radio is switched on, communication can be made for data transfer only.

The above scheme can be a significant improvement because the wireless camera communication can operate on a time frame determined by the need to transmit data of interest, and not on a time frame determined by the client surveillance software application. Also, when multiple cameras are connected to the network using this method, the transmission burst cycle for each camera can be set so as not to interfere which each other. For example, this can be done at initialization time by the burst reception store/control processing module of the base station.

In one implementation, a timestamp can be inserted in the captured images based on the time that the images were captured by the wireless video camera. In this manner, any latency between the time of data capture and the time of viewing or manipulating the images at the client device can be accommodated. For example, suppose that a series of images were captured at 12:00 a.m., however, due to a temporary failure or delay in the transmission the client device does not receive the images until 12:10 a.m. The inserted timestamps in the captured images can be used as the reference point for image processing or manipulation. The insertion of the timestamps can occur at the camera or at the base station.

The base station's high-bandwidth radio MAC firmware can take advantage of "knowing" for long extended periods of time what specific wireless camera radios are associated with it. This can allow set-up and tear down of connections without discovery sequences, by only requiring connection via authentication request and reply followed by the associated request and reply messages. The base station can be implemented in various configurations. In one implementation, a base station implementing standard 802.11 protocols can be used by the system.

Non-Clear Channel Environments

In a non-clear channel environment (e.g., during interference from other transmitters which may be using the channel) the high-bandwidth radio transmission period can be "skipped" and the data that was to be transmitted can be temporarily stored and transmitted on the next available cycle. In these conditions, the period and timing of transmission bursts can vary based on channel conditions.

For example, in one implementation, the camera can include a separate low power circuitry to determine if a high-bandwidth radio transmission channel is open or not prior to a transmission cycle. This information can be used to determine if the high-bandwidth radio in the camera is activated from a power down mode or that transmission period is "skipped" by the camera. Using standard 802.11 MAC protocol, if the channel is open the camera can initiate the transmission process by sending a Request to Send (RTS) frame. The base station can then reply with a Clear To Send (CTS) frame. As specified by the standard, any other node receiving the CTS frame should refrain from sending data for a given time.

Figure 5A:
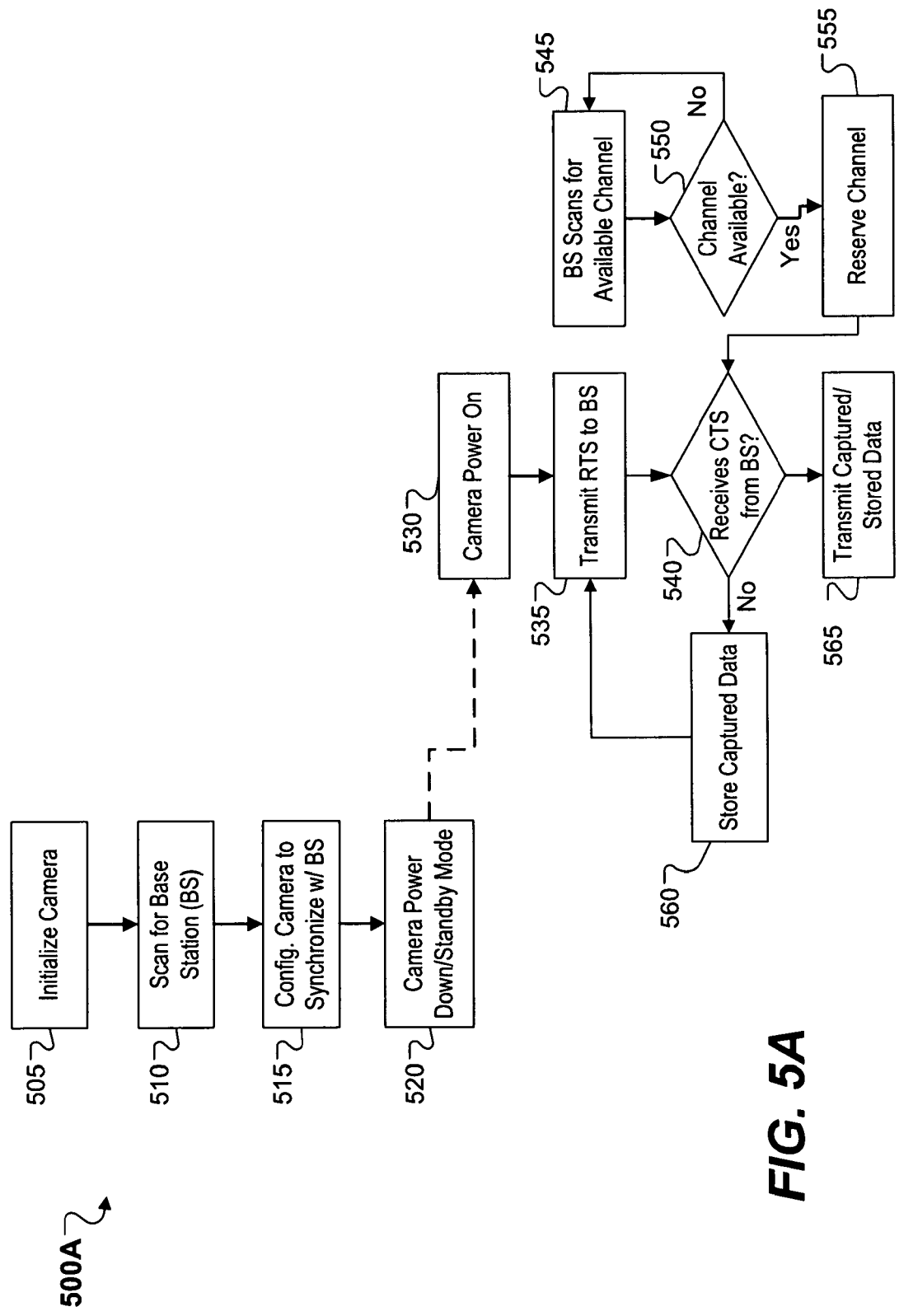
FIG. 5A shows a flow chart example of a MAC algorithm.

FIG. 5A shows a flow chart of a MAC algorithm 500A that can be used by the wireless camera. At 505, the wireless camera is initialized, e.g., by going through a discovery mode. At 510, the wireless camera scans for the base station. At 515, the system configures the wireless camera to synchronize with the base station. Once the wireless camera has been initialized and synchronized with a base station, the camera can then enter a power down or standby mode, at 520, when the camera is inactive. On the other hand, based on a triggering event as described above, at 530, the camera can be powered on and enter active mode.

Once the camera is powered on, at 535, the camera transmits an RTS frame to the base station. If a channel is available, the base station can then reply with a CTS frame. At 540, the system determines whether a CTS frame is received from the base station. If the CTS frame is received, at 565, the camera starts to transmit captured or stored image data. On the other hand, if the CTS is not received from the base station, at 560, the camera stores the captured data in the storage device, and periodically transmits an RTS frame to the base station.

In addition, once the RTS frame has been received by the base station, the base station scans for available channels, at 545. At 550, the base station determines whether there are available channels to establish connection with the wireless camera. If there is an available channel, at 555, the base station reserves the channel and then sends a CTS frame to the camera. On the other hand, if there is no available channel, the base station keeps scanning for available channels.

In another implementation, the base station can include processing circuitries or operating modes that can determine if a high-bandwidth radio transmission channel is open or not on a regular basis. This channel availability information can be transferred to the camera using the secondary low-bandwidth radio connection. One benefit of providing this processing on the base station can be a significant power reduction in the camera, since the processing does not occur using the camera's power. Also, the incorporation of the channel availability processing circuitry or operating mode in the base station can allow for complex and power-intensive processing to be executed for system operation.

The base station can then emulate a standard 802.11 CTS/RTS handshaking operation. In this manner, both the primary and the secondary radios of the base station can be used to establish handshaking. Here the base station itself generates the RTS signal which would normally be expected from the camera. This RTS signal can cause surrounding nodes to stay off the channel. This can also eliminate the need for the camera to generate the RTS signal and allow the camera to shut down between time periods of actual data transmission. As noted above, the camera can be activated by the secondary radio operation to transmit more data, or from an internal timer. The whole sequence of emulated CTS/RTS handshakes of data transmission can be pre-determined.

In one further implementation, if a high-bandwidth radio transmission channel is open, the base station can reserve and hold the channel. It can do this by using standard 802.11 MAC channel accessing techniques. Here the base station can start transmitting "fake" or "filler" energy into the channel "as if" the packets were originating from the camera. During this sequence, the base station can signal the camera using the second wireless link that the bulk channel is open. The base station can then immediately stop transmitting and can "release" the channel. The timing can be configured so that the high-bandwidth radio in the camera can then be activated from a power down and transmission begins such that, from an external observing radio, the channel was never released for any material length of time.

Figure 5B:
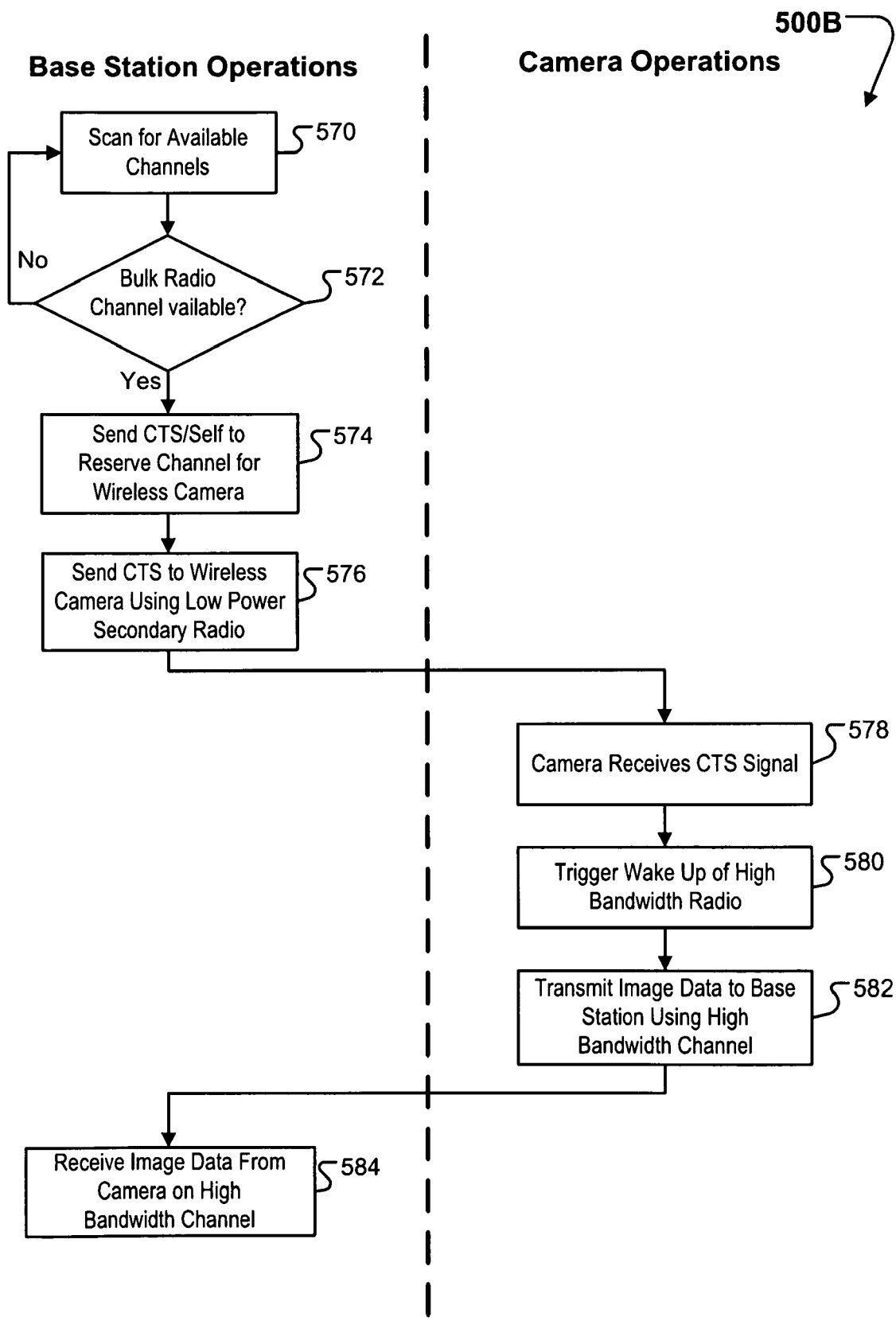
FIG. 5B shows a flow chart example of a process that can be used to implement the CTS-to-Self algorithm.

Additionally, the above method of "reserving" and "holding" of the channel for a period of time can be implemented in the base station using the "CTS-to-self" signaling method in the 802.11 standard in a slightly modified way. This way, an association between the base station and the camera can be established prior to the base station entering the CTS/self mode. FIG. 5B is a flow chart showing a process 500B that can be used to implement the CTS-to-Self algorithm. Initially, at 570, the base station scans for available bulk, high-bandwidth radio channels. At 572, the base station determines whether the bulk, high-bandwidth radio channel is available. If the bulk radio channel is available, at 574, the base station sends a CTS/Self signal to reserve the available channel for a wireless camera. If the bulk radio channel is not available, process 500B iterates at 570 and the base station continues to scan for available channels.

In this manner, the CTS/Self signaling technique available in the 802.11 standard can be used to keep the 802.11 nodes surrounding the base station quiet for a period of time, thereby reserving the available channel. In some 802.11 exchange implementations, the CTS/self may originate from the camera. In contrast, the base station process shown in FIG. 5B can generate the CTS/self signaling as a proxy to the remote node, e.g., wireless camera.

Once the channel has been successful reserved by the base station, at 576, the base station can then send rapidly, with low latency, a proprietary "wake-up/CTS" signal (somewhat similar to the CTS signal) to the wireless camera via the secondary or low-power radio channel. This differs from existing 802.11 MAC procedures where the CTS information is sent once through the primary (or bulk) radio on the camera. At 578, the camera receives the CTS signal from the base station using the secondary (low-power) radio on the camera. The secondary radio on the camera, at 580, then rapidly trigger a "wake-up" signal to the primary bulk transmission radio in the knowledge that the bulk (primary) transmission channel has been reserved and should be clear. At 582, the camera transmits the image data to the base station via bulk transmission channel reserved by the base station. At 584, this image data is received by the base station via the high-bandwidth channel.

One potential advantage of using the above CTS-to-self signaling technique is that the bulk transmission (primary) channel can be held open according to 802.11 standards for a relatively long period of time. This period can be relatively long to allow for backward compatibility with much older (slower) bandwidth modulation schemes such as 1 Mbit/sec. In the standard, the time reserved by a CTS-to-self can be determined by the duration field in the CTS frame. In this method, the CTS is sent by the base station with usual contention period rules (i.e. after the DIFS quiet air time), and it can be honored by any device close enough to correctly demodulate it.

Methods and systems where a base station reserves a high bandwidth channel and alerts a wireless camera when the channel is known to be clear and signaling this through a low-power secondary radio may offer several advantages. For example, such methods and systems can significantly lower the overall power requirement in a wireless camera, because the camera would not have to power up a power intensive bulk transmission receiver radio to determine if the channel is clear. Instead, the camera can power up a high-bandwidth transmitter when the channel is likely to be clear of other WiFi compatible nodes in the network.

Furthermore, the receive environment (or channel availability) for video or audio data transmissions may be best determined at the receiving end, such as at a base station. This is in contrast to an 802.11 based method where a camera performs Carrier Sensing (as part of the usual Carrier Sense Multiple Access/Collision Avoidance (CSMA/CA) protocol). The methods and systems presented herein may ensure that the high bandwidth channel is at a point in a network where interference and collisions may have the most impact such as in terms of the energy seen at the receiver. Therefore, a system where the base station takes advantage of this "local" knowledge may avoid hidden node problems that can occur when the wireless cameras are at great distances from the base station. Such a system may span extremely long distances, such as a mile, while reducing the possibility of data collisions. As a result, such a system may lower the overall energy needed at a wireless camera for re-transmission of lost packets.

In addition, the secondary (low-power and low-bandwidth) radio can implement a hierarchy of up-power modes to provide sustained ultra low power operation. For example, a "carrier sense" mode can be available where only the front-end section of the radio is powered-up to detect if a carrier of a certain narrowband frequency is present. This carrier sense mode can be designed to be extremely low power and can be operational for extended periods of time. In this method of operation, if the front-end section of the secondary radio detects a likely carrier signal, then further demodulation can be triggered to search for a specific leading signature bit sequence. This sequence can be used to determine if the signal is a valid transmission from the base station. If the sequence is valid, then further bits are decoded, if not then the secondary radio can revert back to the low power carrier sense mode.

The method described above, i.e., that of using a low-power secondary radio to receive control, "wake-up" and other information about the status of a primary high-bandwidth transmission channel is different from existing wireless schemes. For example, one difference can include using one modulation scheme for the transmission of control information and a different modulation scheme for the transmission of data (e.g., captured image data) information. This can allow the receiver to be low-bandwidth and be design to consume very low power. Another difference from existing wireless schemes can be that the demodulation and/or carrier detection of the secondary radio can be on for extended periods of time in order to listen for the secondary channel and/or demodulate the control/status information.

Furthermore, potential benefits can be achieved by having the secondary radio on at all times when compared to a secondary radio that uses polling (i.e. comes on at intervals to poll for a transmission). For example, this can reduce the need to have timing synchronization with a base station, and can make the system design simpler and more robust. In addition, this can reduce primary channel (high-bandwidth channel) airtime consumption. The is because a polled secondary radio can, on average, add half the polling interval time to the time needed by the camera to transmit the video images on the primary channel. This additional airtime consumption can impact the overall efficiency of the primary channel. This can affect other nodes sharing the channel in a significant way by reducing their overall throughput. With careful design techniques, this constantly on secondary radio can consume power on average in the order of under 1 mW in power during extended operation. This can further allow the secondary radio to be available for many months to years using the energy from a small battery or a fraction of the energy from a larger battery pack.

In some implementations, a base station can operate circuitry such as a transceiver to detect an availability of a wireless channel using a carrier sense multiple access/collision avoidance (CSMA/CA) protocol, e.g., IEEE 802.11 or WiMax standards base. In a wireless environment with one or more wireless cameras and one or more additional nodes, the base station can transmit data to prevent the surrounding nodes from transmitting. For example, after detecting the availability, the base station can transmit a wireless signal to one or more of the surrounding nodes within wireless range of the base station to cause the surrounding nodes to remain silent on the wireless channel. The base station can transmit a signaling message signaling the availability of the wireless channel to a wireless camera node to cause the node to respond with a wireless video data message. A wireless video data message can include at least a portion of a video feed. The base station can receive and process video from the wireless camera node for remote viewing. In some implementations, a size of the wireless video data message is greater than a size of the signaling message by at least a ratio of 100 to 1. In some implementations, a wireless camera node can operate circuitry such as a transceiver or receiver capable of receiving the signaling message for one or more periods of time averaging less than 5% of elapsed time during extended periods of video transmission. A wireless camera node can spread out these periods of time for receiving signaling messages over a longer period of time. In some implementations, a base station and a wireless camera node can have prearranged periods for transmitting and receiving messages. In some implementations, the wireless camera node can use a 2.4 GHz radio spectrum to transmit the wireless video data message.

Legacy Compatibility Advantages

A further benefit of methods implementing 802.11 MAC compliant protocol processing that include using a secondary radio is that the arrangement is a "good citizen" in a WiFi compatible environment and will behave well with legacy standard 802.11a/b/g nodes. This can allow the deployment to be widespread by not affecting normal operation of a legacy compatible network. In the above methods the latency to "wake-up" the camera through the secondary radio and set-up the link after this trigger can be designed to be as low as possible and is the same parameter as described above as Tsu. The accuracy of the secondary radio to wake up external circuitry may need to be predictable and should ideally in the order of microseconds to avoid wasting bandwidth on the primary (bulk) channel.

The methods and systems presented herein may have several channel and spacial efficiency advantages. Such methods and systems can use high transmit bandwidth speeds exceeding 22 MBits/sec (Mbps). As a result, video and/or audio transported at or over the 22 Mbps rate will occupy less time of the available channels. This allows for better co-existence with other nodes, because this increase available channel airtime for the other nodes. These methods and systems can minimize interference with existing 802.11 nodes and users, and may allow additional cameras and nodes to occupy a given physical zone when compared to cameras that user lower bandwidth (narrow band) modulation methods.

Newer 802.11e Systems with QoS Schemes

In some implementations, the transmission cycles can adhere to standardized system wide quality of service (QoS) schemes, such as that of the IEEE 802.11e standard. The base station can implement a Point Coordination Function (PCF) between these beacon frames. The PCF defines two periods: the Contention Free Period (CFP) and the Contention Period (CP). In CP, the DCF is simply used. In CFP, the base station can send a Contention Free-Poll (CF-Poll) to each camera via the primary (bulk)) or secondary radio, one at a time, to give the camera the permission to send a packet.

In some implementations, the IEEE 802.11e standard using the Hybrid Coordination Function (HCF) can be used. Within the HCF, there are two methods of channel access, similar to those defined in the legacy 802.11 MAC: HCF Controlled Channel Access (HCCA) and Enhanced Distributed Channel Access (EDCA). Both EDCA and HCCA define Traffic Classes (TC). The captured data transmission can be assigned a high priority using this scheme. Using the EDCA method, the base station can assign a specific Transmit Opportunity (TXOP) to a specific camera. A TXOP is a bounded time interval during which a specific camera can send as long as it is within the duration of the pre-assigned TXOP value. Additionally, Wi-Fi Multimedia (WMM) certified nodes need to be enabled for EDCA and TXOP.

Alternatively, the system can also use the HCCA scheme to allow for CFPs being initiated at almost anytime during a CP. This kind of CFP is called a Controlled Access Phase (CAP) in 802.11e. A CAP is initiated by the base station, whenever it wants to send a frame to a remote node, or receive a frame from a node, in a contention free manner. In fact, the CFP is a CAP too. During a CAP, the base station, which can act as the Hybrid Coordinator (HC), controls the access to the medium. During the CP, all stations function in EDCA. The other difference with the PCF is that Traffic Class (TC) and Traffic Streams (TS) are defined. This means that the base station (implementing the HC function) is not limited to per-camera queuing and can provide a kind of per-session service.

Furthermore, the HC can coordinate these streams or sessions in any fashion it chooses (e.g., not just round-robin). Moreover, the stations give information about the lengths of their queues for each Traffic Class (TC). The HC can use this information to give priority to one station over another, or better adjust its scheduling mechanism based on the captured data burst transmission needs as described above. Another difference is that cameras are given a TXOP: they may send multiple packets in a row, for a given time period selected by the HC. During the CP, the HC allows stations to send data by sending CF-Poll frames. With the HCCA, QoS can be configured with great precision. QoS-enabled cameras can have the ability to request specific transmission parameters and timing as determined by the burst transmission needs described above.

Energy Saving Technique 3:

Cycle the image capture module (hardware or software) based on the most efficient use of the module vs. latency, start-up/shut down time, frame rate and storage capacity needs.

For example, in a possible power saving method, after the exposure process, the pixel read out for the image captured from the sensor may occur at the maximum clock output rates allowed by the sensor. This rate may be many times the sustained data rate. This allows the sensor and associated circuitry to power down for significant periods between frame exposures. The image capture engine/processing sections of the camera can also power up and down on a periodic basis independent of other sections of the camera. When operating in the capture mode, uncompressed image can be loaded into an SRAM memory, which temporarily holds the data until it can be processed by the other main sections of the camera. When operating in the power-down mode this section can retain the data in SRAM or some other memory in a low power standby mode.

This cycling can allow the image capturing module to operate independently of other sections. Therefore, each section can cycle on a periodic basis most efficiently to save energy with respect to latency, start-up/shut down time, and storage capacity needs. Further, this cycling technique can offer power savings over that of a simple power down mode where the whole camera except for a "wake-up" section is powered down.

Energy Saving Technique 4:

Cycle the compression module (hardware or software) based on the most efficient use of the module vs. latency, start-up/shut down time and storage capacity needs.

The image compression engine/processing sections of the camera can also power up and down on a periodic basis independent of other sections of the camera. When operating in the capture mode, compressed image is loaded into an SRAM memory, which temporarily holds the data until it can be processed by the other main sections of the camera. When operating in the power-down mode this section can retain the data in SRAM or other memory in a low power standby mode.

This cycling can allow the compression module to operate independently of other sections. Therefore each section can cycle on a periodic basis most efficiently to save energy with respect to latency, start-up/shut down time and storage capacity needs. Further, this cycling technique can offer power savings over that of a simple power down mode where the whole camera except for a "wake-up" section is powered down.

The image compression algorithm in the wireless camera does not need to be the same as the compression algorithm used in the base station for sending image information to the client application. For example, a non-standard, proprietary compression algorithm, which can be cheaper and/or consume lower power, can be used on the camera. The compressed data from the camera can be transcoded to a well-know standard (e.g., a JPEG standard) by the base station; and therefore, the proprietary image compression algorithm of the camera can be "transparent" to the client applications. Alternatively, the compressed data can be relayed directly to the client without transcoding by the base station, if the client can process the compressed data from the camera.

Energy Saving Technique 5:

Use of a low-bandwidth transceiver with a longer range than the high-bandwidth data transmission transceiver for camera control and status report.

Low-bandwidth, low power transceivers can be expected to draw only microwatts of power in receive mode. The modulation techniques and frequency band of the low-bandwidth radio can be different from the high-bandwidth data transmission radio. As noted above, the high-bandwidth and the low-bandwidth radios can be integrated together into a single transceiver block having dual radios. For example, some high volume, low cost commercial chipset radios can include low rate radio modulation schemes for legacy or backwards compatibility reasons. A wireless camera system can include a direct-sequence spread spectrum (DSSS) receiver (which is a modulation scheme for 802.11b). The DSSS receiver can act as the secondary command channel. In some implementations, a wireless camera can include a duty cycle mechanism to minimize power consumption of the DSSS receiver.

The function of the low-bandwidth radio can be for side band communication without having to power up the high-bandwidth radio. It can allow the camera to be "listening" for instructions during deep sleep mode configurations without needing relatively large power drain. The specifications of the low-bandwidth radio can have longer range but much lower bandwidth than the high-bandwidth radio. Thus, under situations where the high-bandwidth radio cannot establish a link with the base station, the low-bandwidth radio can operate as a back-up radio and effectively communicate with the base station.

The low-bandwidth radio can further reduce its "listening" energy consumption by operating in a polling mode. In the polling mode, the radio section of the low-bandwidth radio can cycle from active to standby. During the active mode, the low-bandwidth radio listens for burst transmission from the base station, captures the data and then goes back to stand-by.

Figure 5C:
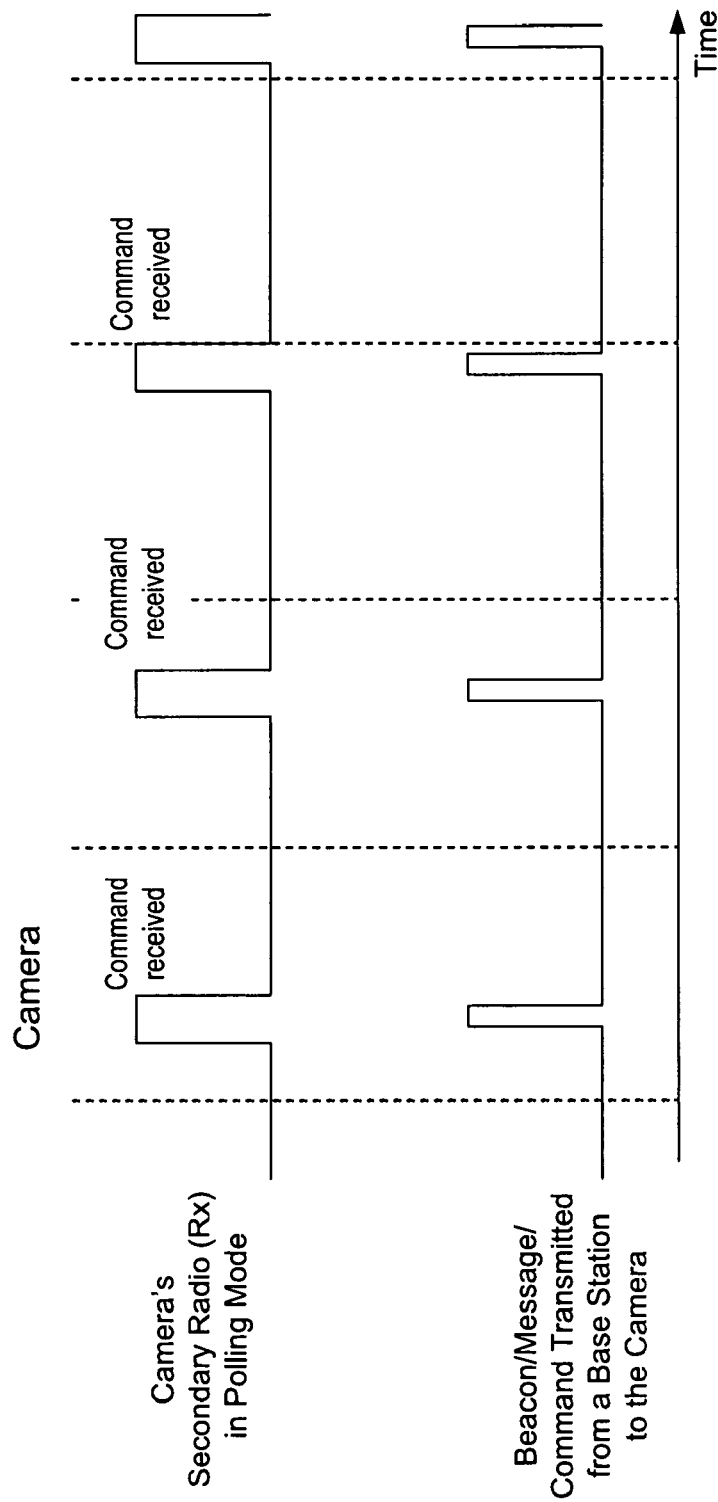
FIG. 5C shows an example of communications between a base station and a wireless camera.

FIG. 5C shows an example of communications between a base station and a wireless camera. A base station can determine cycle timing information. Furthermore, the wireless camera can know the cycle timing information. In accordance with the information, a wireless camera's receiver can synchronize with the base station to power up receiver circuitry to receive information. such as beacons, messages, or commands, from the base station. A base station can transmit beacons several times per second to maintain or minimize latency between capturing of digital information such as images, audio, or videos and a transmission of the digital information to the base station. In FIG. 5C, a wireless camera operates a secondary radio in a polling mode to receive information from a base station, the base station transmits information such as beacons, messages, or commands to the wireless camera.

Furthermore, the low-bandwidth radio can be used to receive Pan/Tilt/Zoom (PTZ) information and other commands. These other commands can be triggering operations such as transmission, capture and compression or shut down for long periods of time. The low-bandwidth radio can further be used to send status information to the base stations regarding the health of various components on the wireless camera (e.g., the high-bandwidth radio). Because the low-bandwidth radio can have lower latency than the high-bandwidth radio, the low-bandwidth radio can be used for two way audio communications.

Energy Saving Technique 6:

Activation of the camera functions based on various triggering events.

As described in detail above, the camera operation can be triggered based by external conditions such availability of light, motion sensing, passive infrared (PIR) detector, sound or time of day, week or month. In one implementation, the triggering event can occur through the processing of the captured image data.

Energy Saving Technique 7:

Use of environmental energy sources.

As described in more detail above, various environmental energy sources, such as solar cells, fuel cells, kinetic power generators and other environmental energy sources can be used to power the camera.

Since the average power consumption of the wireless camera can be relatively small, a solar cell or solar cell array can be used as a power source for the camera. This solar cell or solar cell array can be used to recharge a battery or a high capacity capacitor which can power the camera during night time or low light conditions. Further, since the solar cell can be small, it can be attached to a side of the housing of the wireless camera. A suction cap (e.g., a vacuum, push-on sucker) can be mounted on the solar panel side of the housing. This can allow the camera to be quickly mounted on the inside surface of a window pane of a building or a vehicle, such that the solar cell faces the outside to capture light energy, while the imager lenses conveniently faces inside or outside the vehicle or building to capture images.

Additionally, the entire wireless camera can be recharged on a charging station or can have interchangeable battery packs that can fit into a charging station. For example, the interchangeable battery packs can be similar to the batteries used for cordless phones or mobile phones. The interchangeable battery pack can also use non-rechargeable batteries. Furthermore, the wireless camera can be adhered to a surface with a mounting mechanism. This mounting mechanism can be separate from the wireless camera. This mounting will have means that allow the cameras to attached to the mounting quickly and easily while keeping camera's field of view constant. In another embodiment the camera may be mounted on a window pane using suction-cups.

In one implementation where a solar cell is used to charge a rechargeable battery during hours of light, there can be wear-out of the rechargeable battery. Typically re-chargeable cells can have a limited number of charge, recharge cycles. For example, if the rechargeable cell is good for 365 cycles, the cell can only be usable for approximately one year of day/night recycles, thus limiting the camera life to approximately one year. To avoid this problem, an array of cells can be used by the camera. By selecting from a limited set of cells inside the array that will be used for a given number of cycles, the charge/discharge cycle burden can be distributed over the array.

In one implementation, an array of 12 rechargeable battery cells can be used. The 12 cells can be grouped in groups of three battery cells. One group of three cells can be selected for a 12 month operation of charge and recharge cycles. After 12 months, the next group of three cells can be used, and during the third year the next set of three cells can be used and so on. In this way, overall usable lifetime of the rechargeable battery cell array can significantly exceed that of a single cell. Alternatively, the division of the charge/recharge cycle burden can be achieved by a specialized circuitry that alternates charging between cells or cell groups and on a varying timing cycle other than the 12 month cycle as described above.

During the transmission periods of the high-bandwidth radio, the energy consumption can be significant. Drawing a high current from a small battery cell directly connected to the camera power input can cause accelerated wear out of the battery. Therefore, a high efficiency circuit can be used to avoid the wear out of the battery by limiting the maximum current draw from the battery.

Figure 6:
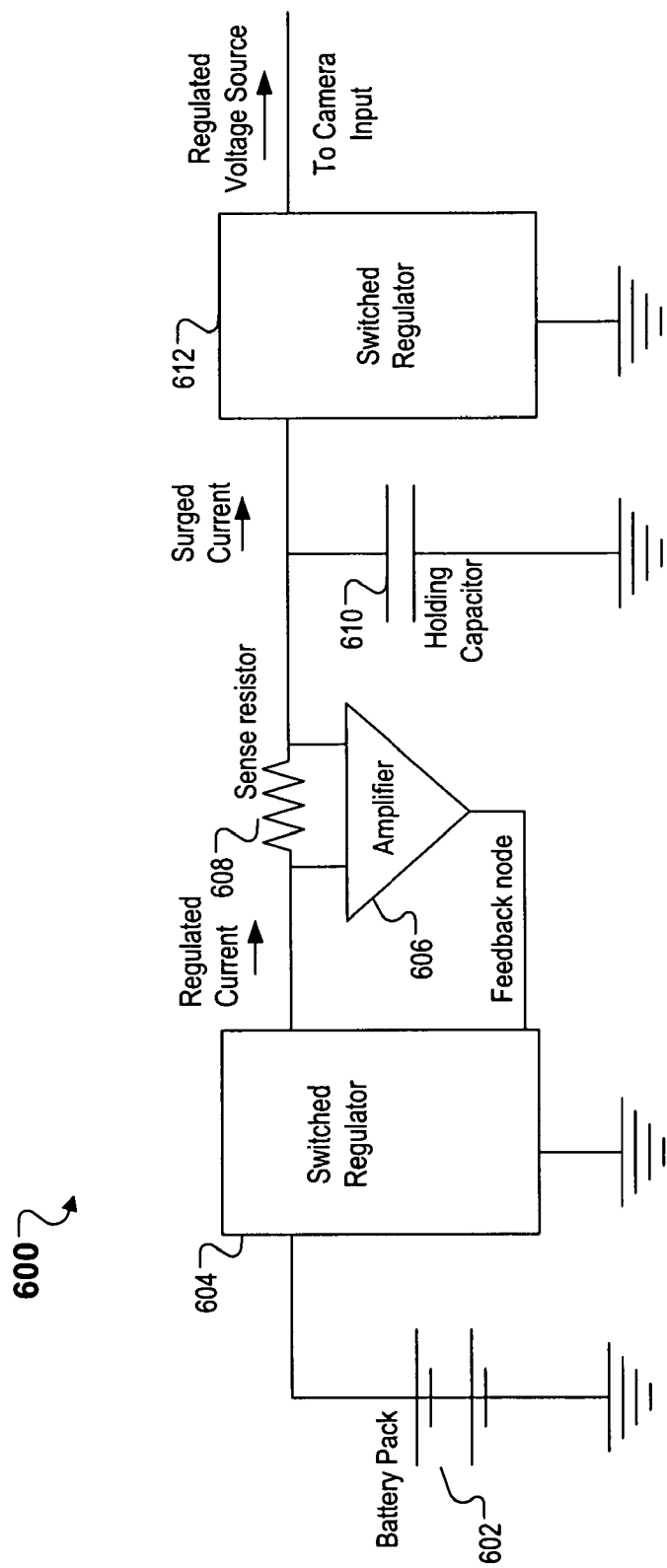
FIG. 6 shows an example of current limiting circuitry.

FIG. 6 shows an example of current limiting circuitry. Current limiting circuitry 600 can couple with a camera's power input. Some circuitry 600 implementations can include a battery pack 602 or alternative energy sources such as solar cells, galvanic cells, fuel cells, kinetic power generators, or other environmental sources. Current limiting circuitry 600 can also help maintain efficient operation in implementations with alternative energy sources.

Current limiting circuitry 600 can include regulator circuitry to control the maximum amount of current drawn from a battery 602 or an alternative energy source. This regulated current draw is then used to charge a holding capacitor sub-circuit 610. The sub-circuit 610 can include a capacitor, a super capacitor, or other high reliability charge holding device capable of handling current surges better than the battery or alternative source. Current limiting circuitry 600 can include a switched regulator 604 (e.g., a buck regulator) or other active type regulator to maximize efficiency in charging the holding capacitor sub-circuit 610. A current sensor feedback loop can be implemented to monitor the current applied to the holding capacitor sub-circuit 610. For example, one monitoring circuitry can be achieved by amplifying the voltage through amplifier 606 across a low value sense resistor 608 connected in series with the supply current.

Additionally, a second regulator can be used as a voltage regulator to supply a controlled voltage source to the camera power input. This voltage regulator can be implemented as a switched regulator 612 (e.g., a buck regulator), or other active regulator to maximize efficiency in supplying a voltage source to the camera input. In one implementation, the power regulation circuit can have the ability to adjust the level of current drawn from the energy source under programming control. For example, this can be achieved by adjusting the gain in a sense feedback loop or the set-point in the feedback voltage. This capability can allow for a variety of alternative energy sources (or modes of operation of those sources) to be used.

A wireless camera can include multiple switches/settings available to a user to increase the camera's easy of use. For example, the camera can include features for operation in darkness (on/off), operation based on sound detection, operation based on infrared detection, and operation based on other triggers. The camera can further include an option for the user to choose the duration of operation (time period the camera needs to operate, e.g., 3 months, 6 months, 1 year or other similar durations). Software can be used to calculate frame rate that need to be used so that the batteries can last for the indicated time.

During set-up mode the camera's wireless link can be powered up continuously (not cycling) for an extended period of time to enable, for example camera focus and field of view set-up to be configured simply and easily. In applications where system latency may cause the period Tc to become unacceptable, the signaling to the low-bandwidth radio can be used to trigger faster cycling and reduce Tc. However, this can reduce energy efficiency. Also, to make the base station easier to install, it can be powered through the Ethernet cable using power over Ethernet by implementing the IEEE 802.3af standard or similar methods.

The characteristics of standard 802.11 wireless links can often lead to unreliable or inconsistent connectivity. This is usually due to interference or other environmental factors. This can make set-up and/or operation erratic. These issues can be addressed through the following methods:

a) The media access techniques used by the system need not be the same as the MAC standards of 802.11. Therefore, in poor connection conditions specific and more restrictive channel access techniques can be used by ignoring other radios and forcing and holding a connection. If the secondary low-bandwidth radio is implemented in the camera, these techniques can be triggered and controlled through the secondary radio since it can establish a link in conditions where the high-bandwidth radio cannot. For example, the base station can include circuitry that determines if a channel is available for the primary radio (bulk high-bandwidth radio).

b) Since the base station has information about the transmission behavior and expected state of the camera, it can detect and correct link problems by requesting retransmission of the data. This request can be sent via the secondary low-bandwidth radio which can be more reliable than the high-bandwidth channel. This retransmission can be hidden and transparent to the client surveillance application through the virtual web server in the base station.

c) A highly asymmetrical radio link can be implemented for the high-bandwidth radio where the antennae and processing in the base station uses high gain techniques such as multi antenna (MIMO) and high sensitivity RF front-end processing to help reliably capture the transmission data from the camera.

Energy Saving Technique 8:

Use of pulsed high efficiency light emitting diode (LED) devices to illuminate the field of view In applications where there is little light, or light has been disrupted by a disaster or a failure condition (e.g., an electrical failure), the camera may operate in the dark and the image sensor may not capture useful data. In conventional camera systems, this situation is addressed by attaching an auxiliary light source near or on the camera. Light sources operating continually to illuminate an observation area during video surveillance can consume significant energy. In one implementation, the wireless camera system described in this specification can save energy by pulsing a high efficient infrared or visible light LED, synchronized to the image capture frequency and phase. The operational duration of this scene illumination light pulse from the LED can be minimized by a careful calculation of the sensitivity and exposure time needed by the image sensor to successfully capture images. In addition, scene illumination using the LED devices need be implemented only when necessary to capture an image, and overall energy consumption of the camera can be reduced.

Camera Shutdown and Privacy Enhancements

In applications where users would like to shut down (or deactivate) certain cameras, various enhancements can be used. In one implementation, for example, all or some camera may need to be shut down in situations where recording is not needed or is preferred to be deactivated. This can include situations where an authorized resident is present such as inside the residence or premises. Another example can be a camera installation in a locker room or changing room for use when these facilities are expected to be empty. This can be due to privacy reasons, or simply that the system operator would prefer certain cameras to be off.

In the deactivated (i.e., non-recording) mode, the secondary, low-bandwidth radio can still be on, giving the camera the ability to be reactivated when necessary. Furthermore, this ability to shut down the camera except for the operation of the low power secondary radio, can also allow for longer batter life. Therefore, each camera can be individually deactivated based on control information received via the primary or secondary radio link.

The camera activation or deactivation can also be manually set by an operator, or be linked to an existing alarm system or to a pre-set timing cycle. Deactivation can be overridden under certain circumstances either automatically (such as an alarm trigger), or manually (locally or remotely). Activation periods of the wireless cameras can be manually overridden. In addition, these periods of override can themselves be timed to last a specific period of time, for example minutes or hours. Furthermore, for ease of use and convenience reasons, the setting, initiating and overriding of the modes of activation/deactivation of cameras can be operated from a hand-held remote control.

A visual indication can be made available on the camera using intermittent flashing LED. For example, a red LED can be used to indicate that the camera is in active recording operation. However, some observers or personnel in the camera's field of view may not believe that the camera image recording or viewing capability is truly "off". In one implementation, to address this concern, the camera can have a mechanically operated, privacy lens cap or an easy-to-observe, visible shutter that obscures the camera lens in an obvious way to make it clear to the observer that the camera cannot be recording or capturing images.

For example, the material of the privacy lens cap can be an opaque material such as a solid sliding window that covers the entire front of the lens surface. To make the fact that the lens is obscured very clear to any observer, the privacy lens cap or visible shutter should be visually clear. For example, if the casing of the camera is white, and since the lens of the camera appears block, the privacy lens cap can be an opaque material such as a solid white sliding window. This way, an observer will not see the darkness of the lens iris or any dark holes on the camera that might indicate an image capturing capability.

A further mechanism to obscure the lens and achieve privacy enhancement can be implemented by causing the lens to retract or roll back into the camera case in such a manner that the lens is no longer pointing into the observation area. For example, in a Pan/Tilt/Zoom (PTZ) type camera this can be implemented by altering the design of the camera to extend the rotational range of the PTZ mechanism beyond the usually implemented range. Therefore, when privacy enhancement is initiated in such an altered PTZ type camera, the visual confirmation to an observer can be somewhat akin to an "eyeball rolling back in its socket."

This mechanical privacy lens cap, shutter or mechanism can be activated or deactivated automatically or manually, and locally or remotely. For example, in some implementations, the user can manually (e.g., using their hands on the camera) initiate activation (closing or obscuring the lens) and deactivation (opening or making the lens visible) of the privacy lens cap or shutter. Furthermore, this privacy lens cap or shutter system can be used on both wired and wireless cameras for privacy enhancement purposes.

The technologies described herein can enable small, including wearable, form factors for wireless cameras that are operable for extended periods of time. The described technologies can reduce power requirements for wireless camera implementations. As a result, smaller and/or lighter weight power supplies can power such wireless cameras. For example, the described technologies can enable a wireless camera to have an earpiece size form factor, e.g., similar to a Bluetooth headset for a mobile phone, and run on 4 or less miniature batteries such as hearing aid batteries for 8 or more hours while producing high quality video at 30 fps, e.g., VGA (640×480) or better video quality. In some implementations, a wireless camera with an earpiece size form factor can have dimensions of less than 3 by 1 by 1 inches. In some implementations, the described technologies can enable a wireless camera to operate for five or more hours to capture and transmit video while drawing less than 50 milliwatts in average energy consumption.

In some implementations, a wireless camera can weigh less than 100 grams as a result of using lighter batteries and the described technologies. In some implementations, a wireless camera can weigh less than 50 grams as a result of using lighter batteries and the described technologies. In some implementations, a wireless camera can weigh less than 30 grams as a result of using lighter batteries and the described technologies. In some implementations, a wireless camera can weigh less than 25 grams as a result of using lighter batteries and the described technologies. Accordingly, the described technologies can enable implementations with a range of form factors and weights.

Figure 7A:
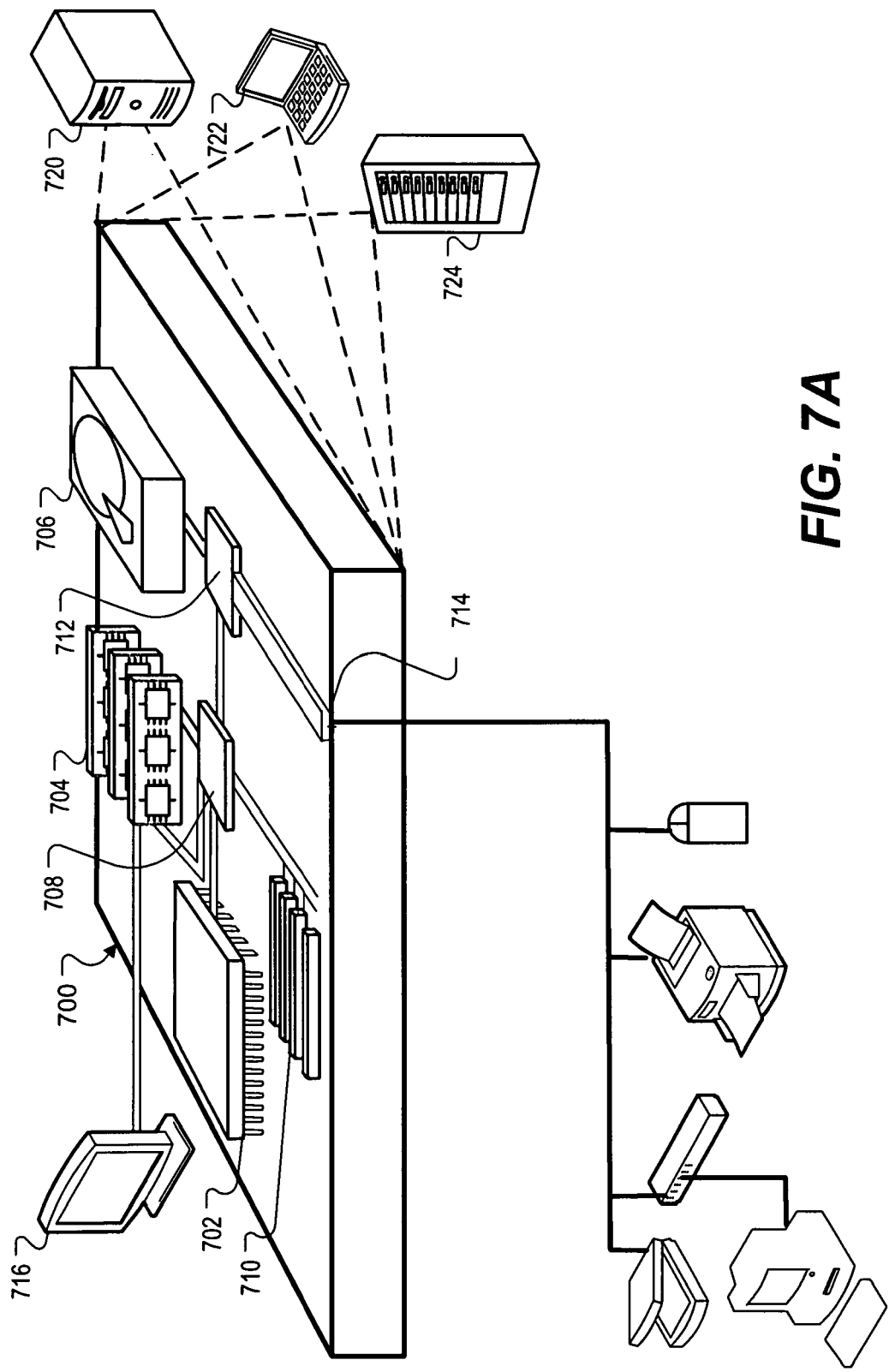
FIGS. 7A,7B show different examples of computing systems and devices.

FIG. 7A shows an example of a computing system. A computer system can include a computer device 700. Computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 700 can include a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Figure 7B:
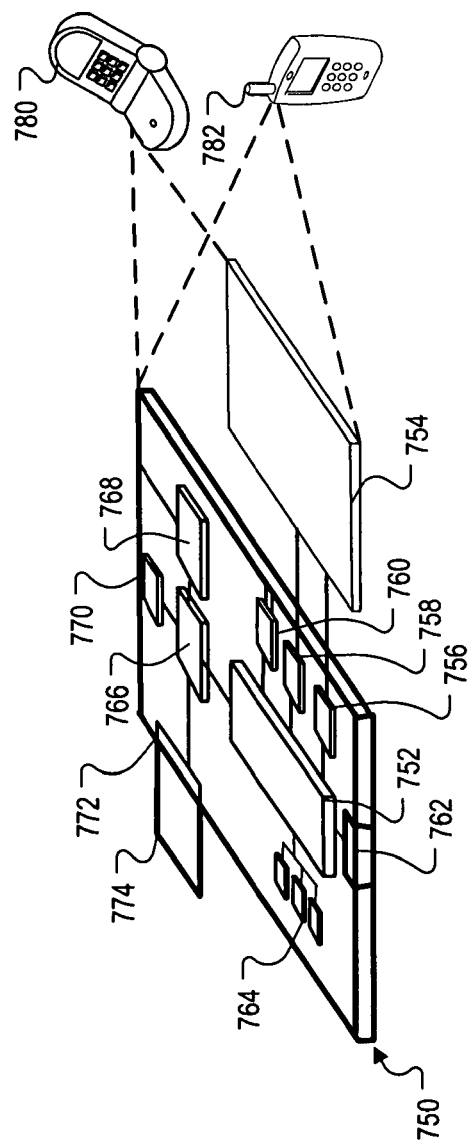

FIG. 7B shows an example of a computing device. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document. A computing device 750 can include a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include point-to-point connections such as universal serial bus (USB) devices or USB hubs, a local area network ("LAN"), and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the described embodiments. For example, the triggering events (e.g., motion, sound, infrared detection) described above can be used to further lower the power consumption of the wireless camera. In many situations video surveillance cameras are placed in areas where there is very little motion for many hours. In these cases, significant energy savings can be gained by reducing the rate of any or all of the following functions: image capture, image compression, image transmission, based on a determination that motion has ceased.

In some implementations, the motion detection can use an external sensor or can be achieved by an algorithm that carries out an analysis of changes between captured images. The algorithm can be implemented in the camera, or in the base station. In some cases, the motion detection processing can be distributed between the camera and the base station. In the case where parts or the entire algorithm is implemented in the base station, information regarding the motion sensing processing can be transferred to the camera by a secondary, low bandwidth radio link. An example of such an algorithm can be found in "Bayesian Illumination-Invariant Motion Detection" by Til Aach and Lutz Dumbgen and Rudolf Mester and Daniel Toth, as described in Vol. III pages 640-643 of Proceedings IEEE International Conference on Image Processing (ICIP).

For example, suppose that a wireless video surveillance camera, as described above, is in a fast image capturing mode. This means that the wireless camera is capturing, compressing, and transmitting images at a high capture rate. A motion detection algorithm can be used to processes the captured image data to determine if there has been motion in the field of view. If at any time the motion detection algorithm determines that there is no motion in the field of view (based on a certain threshold level of probability and criteria), then the camera can enter a slow capture mode and a period of slower capture rate can be initiated.

On the other hand, if the motion detection algorithm determines that motion persists in the field of view, the wireless network camera system continues to capture images at the higher rate. Similarly, during a slow capture mode, the motion detection algorithm can be used to initiate a fast capture mode if motion has been detected.

The amount of energy saving based on the motion detection can be illustrated by analyzing a specific example camera system. Suppose that for a specific camera system, during the fast capture mode the camera operates at 3 frames per second (fps) and consumes 2 mJ per frame. Therefore, the average power dissipation during this fast capture mode is 3 fps×2 mJ per frame=6 mW. Suppose that during the slow capture mode the camera captures one frame every 5 seconds (0.2 fps) and consumes 1.5 mJ per frame. Therefore, the average power dissipation during this slow capture mode is 0.2 fps×1.5 mJ per frame=0.3 mW.

Further suppose that motion is detected 20% of the time overall. Then the sustained average power consumption of the camera in operation will be (20%×6+80%×0.3)=1.44 mW. This is clearly lower power then if the camera were operating in the fast capture mode continuously, which can lead to a sustained average power dissipation of 6 mW during camera operation.

In some implementations, the motion detection algorithm can be performed in the base station, and significant power saving benefits can be achieved because the camera is not used to carry out potentially power-intensive and complex algorithms. In addition, complex and comprehensive algorithms or video analytics can be performed because the base station can have access to more power and more computational resources. In this manner, detection of additional triggering events beyond simple motion and other categories such as object recognition can be achieved. These more comprehensive and complex algorithms can have the potential benefit of increasing the accuracy and reliability of the triggering event detection and reducing probability of false detections or missing activity, objects or events. Examples of these types of algorithms can be seen in, for example, software products like Xprotect from the Milestone Systems A/S Corporation.

In some implementations, the base station can initiate user alerts such as automated cellular phone text messages, phone calls, emails and other textual, visual, or auditory alerts to the user based on a triggering event. The triggering event can be initiated as a result of motion detection through ultrasonic, infrared, acoustic or electrical switch/relay tripping. The triggering event can also be based on the video image processing described above. This message alert capability can avoid the need for the user to constantly monitor the video stream for a triggering event.

In some implementations, the base station can alter the image capture rate in response to information or control data from a client device which is pulling images from the base station. For example, the client may distinguish between "active user observation" mode or "automatic/passive image capture" mode. During the "active user observation mode," the base station can receive information from a client based on the fact that a user (human observer) is actively monitoring or wishes to monitor the video stream. This information or control data can be communicated to the base station and cause the base station to increase the frame capture rate. During the "automatic/passive image capture mode," the base station can receive information or control data from the client because a network digital video recording or other process is responsible for requesting images. Additionally, the base station can automatically determine the image capture rate based on activity or triggers detected by the camera or the base station itself. This detection of motion, or an object of interest, or a trigger activity can cause the base station to decrease the rate of image capture. Accordingly, other embodiments are within the scope of the following claims.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A wearable form factor wireless camera comprising:
   an image sensor for capturing video, the image sensor powered by a battery internal to the wearable form factor wireless camera, wherein the wearable form factor wireless camera is configured to attach to clothing worn on a user and is ruggedized;
   a burst transmission unit, operatively coupled to the image sensor and powered by the battery, to transmit video via a cellular network; and
   video analytics software executed by a processor internal to the wearable form factor wireless camera, operatively coupled to a buffering memory and powered by the battery, the video analytics software operating in a first mode of operation and a second mode of operation;
   a storage device internal to the wearable form factor wireless camera and operatively coupled to the image sensor, the burst transmission unit and the processor, and powered by the battery, to store video information at a first fidelity, the stored video information capable of being transmitted to a base station at the first fidelity and at a second fidelity;
   wherein the video analytics software, executed by the processor operating with the buffering memory and powered by the battery, switches from the first mode of operation to the second mode of operation upon an occurrence of a trigger event;
   wherein when in the first mode of operation, the burst transmission unit transmits video at the second fidelity and a slower bit rate in a first burst mode that has a first time between bursts, wherein the first time between bursts includes an associated set up time and an associated tear down time;
   wherein when in the second mode of operation, the burst transmission unit transmits video, including stored video information, at the first fidelity and a faster bit rate, the faster bit rate being faster than the slower bit rate, wherein transmitting at the faster bit rate includes transmitting in a second burst mode that has a second time between bursts that is lower than the first time between bursts, wherein the second time between bursts includes an associated set up time and an associated tear down time; and
   wherein the second mode of operation and the first fidelity provides higher video quality than the first mode of operation and the second fidelity.

2. The wearable form factor wireless camera of claim 1, wherein the trigger event includes a sound detection, an infrared motion detection, an ultrasonic detection, a relay switch, a micro switch, or a radio signaling circuitry.

3. The wearable form factor wireless camera of claim 2, wherein the sound detection trigger event includes a detection of a shock wave, a breaking of glass, or a shattering of glass.

4. The wearable form factor wireless camera of claim 1, wherein the trigger event is video processing based movement detection.

5. The wearable form factor wireless camera of claim 1, wherein the trigger event is initiated by a user input.

6. The wearable form factor wireless camera of claim 5, wherein the user input is provided to the camera via a base station.

7. The wearable form factor wireless camera of claim 1, wherein when in the first mode of operation, the image sensor captures the video at a slower frame rate.

8. The wearable form factor wireless camera of claim 1, wherein when in the second mode of operation, the image sensor captures the video at a faster frame rate.

9. The wearable form factor wireless camera of claim 1, wherein the burst transmission unit is a radio.

10. The wearable form factor wireless camera of claim 1, wherein the burst transmission unit transmits the video to a computer system.

11. The wearable form factor wireless camera of claim 1, wherein the computer system is a server.

12. The wearable form factor wireless camera of claim 1, wherein the wearable form factor wireless camera pulses a highly efficient infrared or visible light LED synchronized to an image capture frequency and phase.

13. The wearable form factor wireless camera of claim 1, wherein the burst transmission unit of the wearable form factor wireless camera comprises multiple output circuits with respective different power amplifier bias settings, wherein each of the output circuits comprise a power amplifier and antenna matching circuitry.

14. The wearable form factor wireless camera of claim 13, wherein the burst transmission unit is configured to select one of the output circuits for data transmission based on a wireless link condition.

15. The wearable form factor wireless camera of claim 1, wherein the burst transmission unit is configured to transmit information corresponding to burst periods, to a base station, wherein the burst transmission unit generates orthogonal frequency division modulation (OFDM) transmission symbols.

16. The wearable form factor wireless camera of claim 15, wherein the burst transmission unit generates the transmission symbols corresponding to one of 24 Mbps, 36 Mbps, 48 Mbps, 54 Mbps, and 65 Mbps data rates.

17. The wearable form factor wireless camera of claim 15, wherein the burst transmission unit generates the transmission symbols corresponding to a data rate that exceeds 22 Mbps.

18. The wearable form factor wireless camera of claim 1, wherein the wearable form factor wireless camera has a small form factor.

19. The wearable form factor wireless camera of claim 1, wherein the battery powers the wearable form factor wireless camera to operate for up to five hours.

20. The wearable form factor wireless camera of claim 1, wherein the wearable form factor wireless camera draws less than 50 milliwatts in average energy consumption.

21. The wearable form factor wireless camera of claim 1, wherein the wearable form factor wireless camera weighs less than 50 grams.

22. The wearable form factor wireless camera of claim 1, wherein the wearable form factor wireless camera weighs less than 25 grams.

23. A method, in a wearable form factor wireless camera, of video delivery comprising:
    capturing video by an image sensor of the wearable form factor wireless camera, the image sensor powered by a battery internal to the wearable form factor wireless camera, wherein the wearable form factor wireless camera is attached to clothing worn on a user and is ruggedized;
    storing video information, by a storage device being internal to the wearable form factor wireless camera, operatively coupled to the image sensor and powered by the battery, at a first fidelity, the stored video information capable of being transmitted to a base station at the first fidelity and at a second fidelity; and
    transmitting, via a cellular network by a burst transmission unit, the video in a first mode of operation and a second mode of operation, the burst transmission unit, operatively coupled to the image sensor and the storage device, and powered by the battery;
    wherein transmitting switches, by video analytics software executed by a processor internal to the wearable form factor wireless camera, operatively coupled to a buffering memory and powered by the battery, from the first mode of operation to the second mode of operation upon an occurrence of a trigger event;
    wherein in the first mode of operation, the burst transmission unit transmits video at the second fidelity and a slower bit rate in a first burst mode that has a first time between bursts, wherein the first time between bursts includes an associated set up time and an associated tear down time;
    wherein when in the second mode of operation, the burst transmission unit transmits video, including the stored video information, at the first fidelity and a faster bit rate, the faster bit rate being faster than the slower bit rate, wherein transmitting at the faster bit rate includes transmitting in a second burst mode that has a second time between bursts that is lower than the first time between bursts, wherein the second time between bursts includes an associated set up time and an associated tear down time; and
    wherein the second mode of operation and the first fidelity provides higher video quality than the first mode of operation and the second fidelity.

24. The method of video delivery of claim 23, wherein the trigger event includes a sound detection, an infrared motion detection, an ultrasonic detection, a relay switch, a micro switch, or a radio signaling circuitry.

25. The method of video delivery of claim 23, wherein the trigger event is a video processing based movement detection.

26. The method of video delivery of claim 23, wherein when in the first mode of operation, the image sensor captures the video at a slower frame rate.

27. The method of video delivery of claim 23, wherein when in the second mode of operation, the image sensor captures the video at a faster frame rate.

28. The method of video delivery of claim 23, wherein the burst transmission unit is a radio.

29. The method of video delivery of claim 23, wherein the video is received by a computer system.

30. The method of video delivery of claim 29, wherein the computer system is a server.

31. The method of video delivery of claim 23, wherein the wearable form factor wireless camera pulses a highly efficient infrared or visible light LED synchronized to an image capture frequency and phase.

32. The method of video delivery of claim 23, wherein the wearable form factor wireless camera has a small form factor.

33. The method of video delivery of claim 23, wherein the battery powers the wearable form factor wireless camera to operate for up to five hours.

34. The method of video delivery of claim 23, wherein the wearable form factor wireless camera draws less than 50 milliwatts in average energy consumption.

35. The method of video delivery of claim 23, wherein the wearable form factor wireless camera weighs less than 50 grams.

36. The method of video delivery of claim 23, wherein the wearable form factor wireless camera weighs less than 25 grams.

\* \* \* \* \*